(12) United States Patent
Alakuijala et al.

(10) Patent No.: US 11,695,919 B2
(45) Date of Patent: Jul. 4, 2023

(54) LOSSY IMAGE COMPRESSION USING PALETTIZATION OF LOCALLY MIXED COLORS

(71) Applicant: GOOGLE LLC, Mountain View, CA (US)

(72) Inventors: Jyrki Alakuijala, Wollerau (CH); Alexander Rhatushnyak, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 373 days.

(21) Appl. No.: 17/093,926

(22) Filed: Nov. 10, 2020

(65) Prior Publication Data

US 2021/0058613 A1 Feb. 25, 2021

Related U.S. Application Data

(63) Continuation-in-part of application No. 16/114,471, filed on Aug. 28, 2018, now Pat. No. 10,848,787.

(51) Int. Cl.
*H04N 19/105* (2014.01)
*H04N 19/91* (2014.01)
*H04N 19/176* (2014.01)
*H04N 19/186* (2014.01)
*H04N 19/96* (2014.01)

(52) U.S. Cl.
CPC ......... *H04N 19/105* (2014.11); *H04N 19/176* (2014.11); *H04N 19/186* (2014.11); *H04N 19/91* (2014.11); *H04N 19/96* (2014.11)

(58) Field of Classification Search
None
See application file for complete search history.

(56) References Cited

U.S. PATENT DOCUMENTS

| 7,072,512 B2 | 7/2006 | Mehrotra |
| 8,599,214 B1 | 12/2013 | Dall et al. |
| 8,780,996 B2 | 7/2014 | Bankoski et al. |
| 8,855,410 B2 | 10/2014 | Fenney |

(Continued)

FOREIGN PATENT DOCUMENTS

| EP | 3007423 A1 | 4/2016 |
| WO | 2015091879 A2 | 6/2015 |

OTHER PUBLICATIONS

Bankoski, et al., "Technical Overview of VP8, An Open Source Video Codec for the Web", Jul. 11, 2011, 6 pp.

(Continued)

*Primary Examiner* — Wen W Huang
(74) *Attorney, Agent, or Firm* — Young Basile Hanlon & MacFarlane, P.C.

(57) ABSTRACT

An apparatus includes a processor that is configured to select a palette entry in the palette for coding a value of a pixel of the image block; obtain respective palette indexes of neighboring pixels of the pixel; select, using the respective palette indexes, an entropy code for coding an index of the palette entry; and code the palette entry using the entropy code. A method includes obtaining respective palette indexes of neighboring pixels of a pixel of the image block; selecting an entropy code using the respective palette indexes; decoding, from a encoded bitstream, an index of a palette entry; and setting a value of the pixel using the palette entry.

20 Claims, 15 Drawing Sheets

(56) References Cited

U.S. PATENT DOCUMENTS

| | | | |
|---|---|---|---|
| 9,363,517 B2 | 6/2016 | MacInnis et al. | |
| 9,558,567 B2 | 1/2017 | Guo et al. | |
| 9,654,777 B2 | 5/2017 | Guo et al. | |
| 9,807,402 B2 | 10/2017 | Lin et al. | |
| 10,055,189 B2 | 8/2018 | Tsai et al. | |
| 2015/0341643 A1* | 11/2015 | Xu | H04N 19/176 375/240.02 |
| 2015/0365670 A1* | 12/2015 | Chang | H04N 19/593 375/240.02 |
| 2015/0373340 A1* | 12/2015 | Zou | H04N 19/186 375/240.24 |
| 2015/0381994 A1* | 12/2015 | Yu | H04N 19/186 375/240.24 |
| 2016/0100177 A1* | 4/2016 | Pu | H04N 19/176 375/240.24 |
| 2016/0227247 A1* | 8/2016 | Zou | H04N 19/137 |
| 2016/0316214 A1 | 10/2016 | Gisquet et al. | |
| 2016/0316217 A1* | 10/2016 | Hatakeyama | H04N 19/136 |
| 2017/0318302 A1* | 11/2017 | Ye | H04N 19/70 |
| 2017/0374372 A1* | 12/2017 | Liu | H04N 19/186 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video. Advanced video coding for generic audiovisual services, International Telecommunication Union, Version 11, Mar. 2009. 670 pp.

Series H: Audiovisual and Multimedia Systems, Infrastructure of audiovisual services—Coding of moving video. Advanced video coding for generic audiovisual services, International Telecommunication Union, Version 12, Mar. 2010, 676 pp.

Series H: Audiovisual and Multimedia Systems, Infrastructure of audiovisual services—Coding of moving video. Amendment 2: New profiles for professional applications, International Telecommunication Union, Apr. 2007, 75 pp.

Series H: Audiovisual and Multimedia Systems, Infrastructure of audiovisual services—Coding of moving video. Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video. Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video. Advanced video coding for generic audiovisual services, Version 1, International Telecommunication Union, May 2003, 282 pp.

Series H: Audiovisual and Multimedia Systems, Infrastructure of audiovisual services—Coding of moving video. Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Https://groups.google.com/a/webmproject.org/forum/#topic/webpdiscuss/W-iFWM1jGh8.

International Search Report and Written Opinion of International Application No. PCT/US2019/034108 dated Oct. 24, 2019; 14 pages.

Xiu X et al: "Description of screen content coding technology proposal by InterDigital", JCT-VC Meeting Mar. 27, 2014-Apr. 4, 2014; Valencia; (Joint Collaborative Team On Video Coding of ISO/IEC JTC1/SC29/WG11 and ITU-T SG.16); 30 Pages.

Pu Wei et al: "Palette Mode Coding in HEVC Screen Content Coding Extension", IEEE Journal On Emerging and Selected Topics in Circuits and Systems, IEEE, Piscataway, NJ, USA, vol. 6, No. 4, Dec. 1, 2016, pp. 420-432.

* cited by examiner

LOSSY IMAGE COMPRESSION USING PALETTIZATION OF LOCALLY MIXED COLORS

CROSS-REFERENCE TO RELATED APPLICATIONS

This application is a continuation-in-part of U.S. patent application Ser. No. 16/114,471, filed on Aug. 28, 2018, the entire disclosure of which is incorporated herein by reference.

BACKGROUND

Image content (e.g., still images or frames of video) represents a significant amount of online content. For example, a web page may include multiple images, and a large portion of the time and resources spent rendering the web page are dedicated to rendering those images for display. The amount of time and resources required to receive and render an image for display depends in part on the manner in which the image is compressed. As such, an image can be rendered faster by reducing the total data size of the image using lossy compression and decompression techniques.

Lossy compression techniques seek to represent image content using fewer bits than the number of bits in the original image. Lossy compression techniques can introduce visual artifacts, such as ringing artifacts, into the decompressed image. Higher compression levels can result in more observable ringing artifacts. It is desirable to minimize the ringing artifacts while maintaining high levels of compression.

SUMMARY

A first aspect is an apparatus for coding an image block using a palette. The apparatus includes a processor that is configured to select a palette entry in the palette for coding a value of a pixel of the image block; obtain respective palette indexes of neighboring pixels of the pixel; select, using the respective palette indexes, an entropy code for coding an index of the palette entry; and code the palette entry using the entropy code.

A second aspect is a method for decoding an image block using a palette. The method includes obtaining respective palette indexes of neighboring pixels of a pixel of the image block; selecting an entropy code using the respective palette indexes; decoding, from a encoded bitstream, an index of a palette entry; and setting a value of the pixel using the palette entry.

A third aspect is an apparatus for decoding an image block. The apparatus includes a processor that is configured to select a fixed palette including fixed palette entries; select a mixed palette including mixed palette entries, each mixed palette entry respectively indicates a recipe for mixing color values of pixels of a pixel neighborhood, where the pixel neighborhood indicates, for a to-be-decoded pixel, locations of pixels proximal to the to-be-decoded pixel whose color values are to be combined to decode the to-be-decoded pixel; and decode first pixels of the image block using the mixed palette.

These and other aspects of the present disclosure are disclosed in the following detailed description of the embodiments, the appended claims, and the accompanying figures.

DETAILED DESCRIPTION

Figure 1:
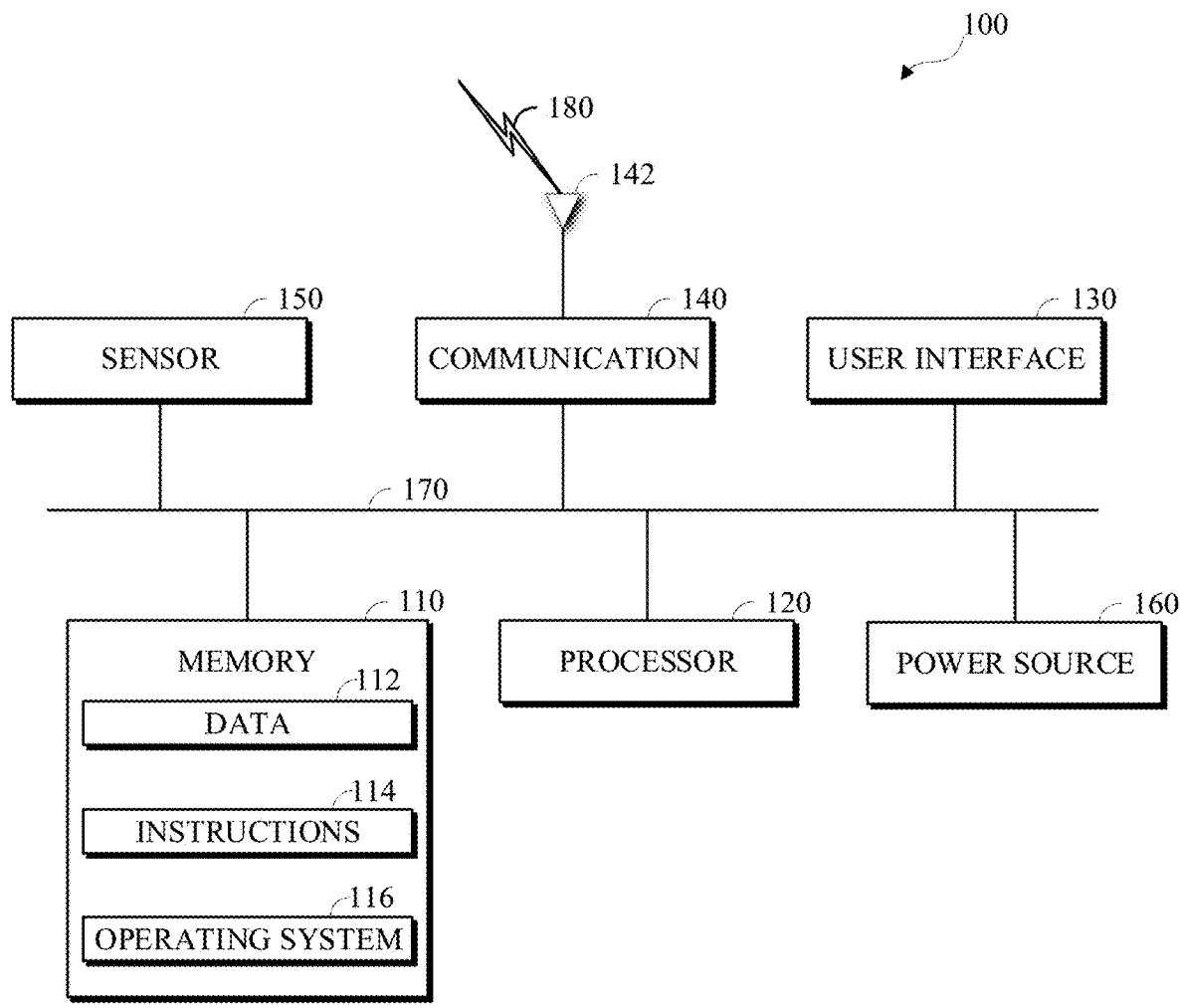
FIG. 1 is a diagram of a computing device in accordance with implementations of this disclosure.

Compression schemes related to coding video streams and/or images, which may be frames of video streams, may include breaking the images into blocks and generating a digital output bitstream (i.e., an encoded bitstream) using one or more techniques to limit the information included in the output bitstream. A received bitstream (e.g., a sequence of images that constitute a video stream or individual images) can be decoded to re-create the blocks and the source images from the limited information. Encoding a stream, or a portion thereof, such as a frame or a block, can include using temporal (in the case of video streams) or spatial similarities in the video stream to improve coding efficiency. For example, a current block of a video stream may be encoded based on identifying a difference (residual) between the previously coded pixel values, or between a combination of previously coded pixel values, and those in the current block. In this disclosure, an image block refers to a block of a single image (e.g., an image that is not part of a video stream) or a block of a frame of a video stream.

Encoding using spatial similarities can be known as intra prediction. Intra prediction attempts to predict the pixel values of an image block using pixels peripheral to the block; that is, using pixels that are in the same frame as the block but that are outside the image block.

Encoding using temporal similarities can be known as inter prediction. Inter prediction attempts to predict the pixel values of a block of a current frame using a possibly displaced block or blocks from one or more reference frame. A reference frame is a frame (i.e., a picture) that appears earlier or later in time in the video stream than the current frame A reference frame that appears later in time than the current frame may be received by a decoder before the current frame. As such, inter prediction may be used for image blocks that are part of a video stream.

Another encoding technique, referred to herein as palette-based encoding, can also be used. The encoder determines whether an image block of an image is encoded using inter-prediction, intra-prediction, or palette-based encoding. While references may be made to palette-based encoding that can be performed by an encoder, it is to be understood that a parallel palette-based decoding that can be performed by a decoder to decode an image block, an image, or the like that is encoded using palette-based encoding.

In palette-based coding, a set of colors (known as a palette) is used for encoding an image block. The palette typically includes a limited number of colors as compared to the number of pixels in the image block. For example, given an image block of size 64×64, which includes 64*64=4096 pixels, a palette that includes only 256 colors may be used for encoding the image block. The palette can be thought of as a table of colors where each entry in the table corresponds to a color. Each color in the palette can have an index, which corresponds to the order of the color in the list of colors of the table (i.e., the palette). As a person skilled in the art recognizes, a "color" is typically includes several color components (also referred to as color channels). As such, and unless the context implies otherwise, references to "color" are understood to mean "the color components of the color."

In the encoding process, the encoder may map each of the pixels of the image block to a closest color by, for example, assigning the corresponding color index to the pixel. The assignment of pixels to color indexes may be referred to as a pixel mapping, which results in a pixel map. The pixel map can be a matrix of the same size as the image block. Each entry of the pixel map corresponds to a co-located pixel in the image block. Each entry in the pixel map can correspond to (e.g., can be) a color index of the palette. The palette and the pixel map can be included in a bitstream. A decoder can decode the palette and the pixel map to reconstitute (e.g., reconstruct) the image block.

Some techniques have been used to improve palette-based coding. For example, in some techniques, rather than mapping a pixel to a closest color in the palette, where the closest color may not be sufficiently close to the source color of the pixel, an escape can be used so that the source color of the pixel is included in the pixel map and/or the encoded bitstream.

Palette-based coding can be an efficient way of compressing images. Having a small number of colors can result in a compact representation of an image block. For example, when the relation of the colors in an image is non-linear, palette-based coding may be the most efficient way to describe the correlations of colors in the image. Examples of non-linear relations of colors can be found in comic book images, computer graphics images, screen capture image, and/or images of irregular specular reflections in a colorful environment. Because of the efficiency of palette-based coding in encoding such images, some video codecs (such as the AV1, to name one) include a local palette mode for palette-based encoding.

However, palette-based coding can result in decoded images that include artefacts, such as staircasing artefacts. For example, source images may include local gradients that result from the point-spread-function of a capturing device, from anti-aliasing effects of the imaged structures, or from naturally and slowly developing image structures. For such images, palette-based coding may result in image artefacts, such as artificial staircasing, in the decoded (i.e., reconstructed) images. Artefacts, such as staircasing effects, are undesirable. Staircasing artefacts may also be referred to as banding artefacts.

Figure 16:
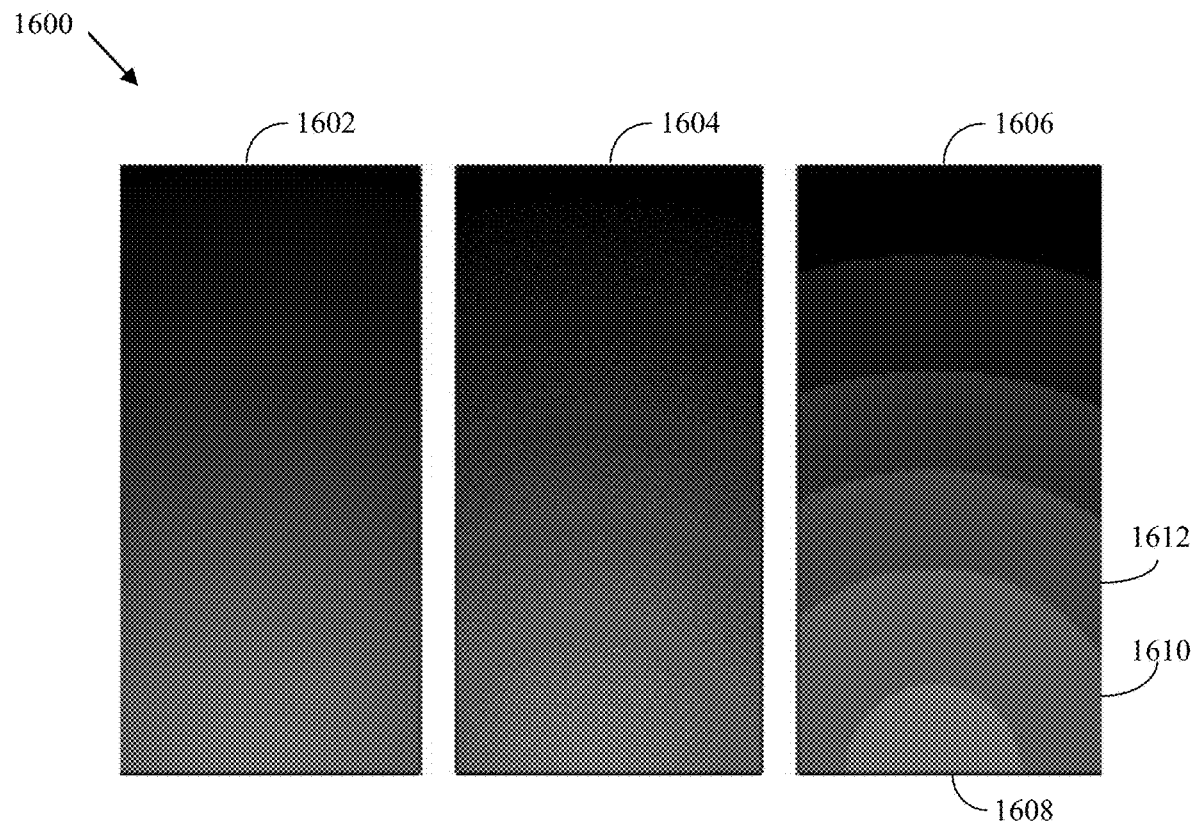
FIG. 16 is an illustration of an example of staircasing in palette-based coding.

FIG. 16 is an illustration of an example 1600 of staircasing in palette-based coding. The example 1600 includes a source image portion 1602. The source image portion 1602 can include several colors; however, the source image portion 1602 is shown here in monochrome colors for reproduction reasons. The source image portion 1602 illustrate smooth and gradual transitions between different shades of grey. A palette-based decoded representation 1604 and a palette-based decoded representation 1606 of the source image portion 1602 illustrate staircasing effects. The staircasing effects can be more prominent, as shown in the palette-based decoded representation 1606, when fewer colors are used in the palette used to encode and decode the source image portion 1602. Whereas the source image portion 1602 includes smooth color transitions, color bands (such as color bands 1608-1612) are formed in the palette-based decoded representation 1606.

Another example of palette-based coding artefacts is now presented. Assume that an image is that of a glossy whiteboard upon which light sources are shined at different locations. As such, the image of the whiteboard may include small gradients and transition areas from white to light grey. Palette-based encoding the image may create banding effects, as described above. That is, for example, instead of gradual color changes, some bands (e.g., 16 bands) of grey may show in the decoded image where hard, artificial borders may form in the decoded image.

To counter the banding effects, techniques such as dithering and/or blurring (for example, by adding noise to the decoded image) can be used. However, such techniques can change the quality of the image. That is, such techniques may change the quality of the surfaces and textures of the source image. For example, instead of the glossy whiteboard, the whiteboard may appear grainy in the decode image. Texture loss may be undesirable, at least in certain applications and/or contexts. For example, in the context of on-line shopping, it is critical to preserve textures and material properties in the images that on-line shoppers see, such as in a web-browser, while browsing an on-line store.

Implementations according to this disclosure can result in smoother decoded images when palette-based coding is used. By mixing colors that are included in a palette, a decoder can produce images that are smoother (e.g., do not include staircasing artefacts). Implementations according to this disclosure can be likened to how an artist uses a palette. An artist's palette typically includes a finite set of colors. The artist can, using a brush, mix several colors on a canvas. By mixing colors that are included in a palette, a decoder can create smoother transitions from one color to a next color in a decoded image. As such, the number of colors in the palette can be limited and artefacts, such as banding artefacts, can be eliminated, or at least, limited.

Figure 17:
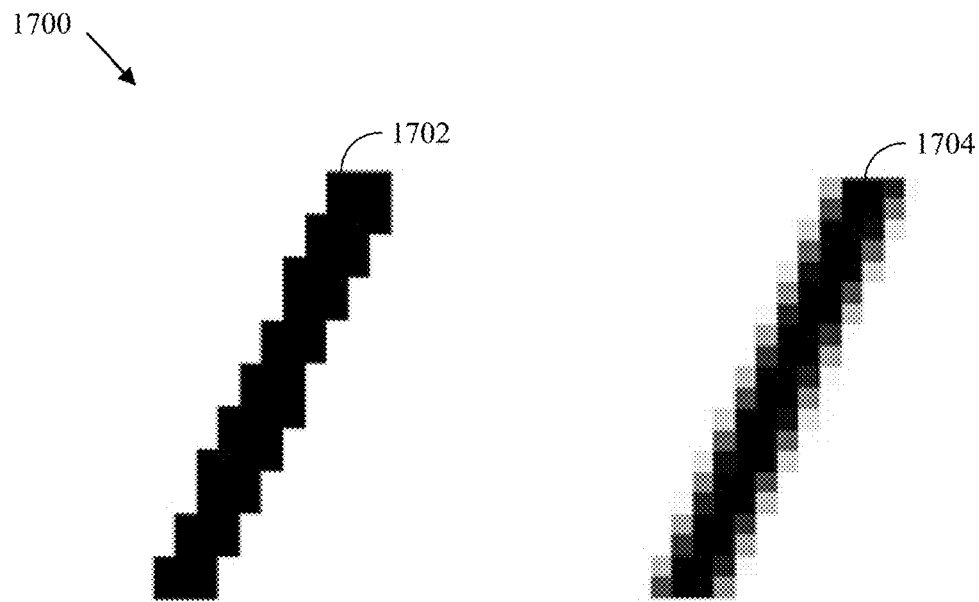
FIG. 17 illustrates an example of anti-aliasing.

Implementations according to this disclosure can replicate anti-aliasing effects in palettized images (i.e., images that are coded using palette-based coding) and increase the natural appearance of palettized images without increasing (i.e., while limiting) the number of colors in the palette. As is known, anti-aliasing is a technique of smoothing edges of objects (e.g., lines, curves, etc.) that result from displaying such objects on pixelated displays. FIG. 17 illustrates an example 1700 of anti-aliasing. The example 1700 illustrates a portion of an image that is a straight line. However, when the straight line is displayed on a computer display, the straight line appears as a jagged line 1702, due to aliasing. Anti-aliasing can produce smoother curves (e.g., smoother lines), such as shown in an anti-aliased line 1704.

Implementations of palette-based coding according to this disclosure use a fixed palette and a mixed palette. The fixed palette includes fixed palette entries of colors. For example, and as further described below, each entry can include values of the color components of a color. The mixed palette includes mixed palette entries. As further described below, each mixed palette entry describes how a color is to be manipulated (e.g., modified, changed, etc.).

Implementations according to this disclosure can result in a 4% gain in the compression of images such as comic book images, computer graphics images, screen capture images, and photographic/video scenery where colors are difficult to decorrelate using linear methods. Using a mixing palette (i.e., a combination of a fixed palette and a mixed palette) can render palette-based encoding far more expressive with respect to dealing with (e.g., encoding) subtle and incremental local changes and/or gradients, which are not typically adequately handled with the use of fixed palettes only.

A mixed palette entry includes deltas for each of the color components of a color. For example, in the RGB color space, a mixed palette entry can be (−15, 15, −140). That is, the mixed palette entry corresponds to, given a color, subtracting 15 from the RED color value of the color, adding 15 to the GREEN color value of the color, and subtracting 140 from the BLUE component of the color. As such, given the color GOLD, which corresponds to the RGB values (255, 215, 0), manipulating the GOLD color using the mixed palette entry (−15, 15, 140) results in the KHAKI color, which can be described by the RGB values (240, 230, 140).

While the example above uses the RGB color system, the disclosure herein is not so limited. For example, any other color system, such as YUV, CMYK, or other color system can be used. While the example above uses decimal values to describe the manipulation deltas, the disclosure wherein is not so limited. For example, percentages can be used.

Details of lossy image compression using palettization of locally mixed colors are described herein with initial reference to a system in which the teachings herein can be implemented.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated in any number of separate physical units. For example, the user interface 130 and processor 120 can be integrated in a first physical unit, and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuit (ASIC), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio and/or visual data, encoded audio and/or visual data, decoded audio and/or visual data, or the like. The visual data can include still images, frames of video sequences, and/or video sequences. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special-purpose processor, or circuitry, that can include specialized hardware for carrying out any of the methods, algorithms, aspects, or combinations thereof, as described herein. Portions of the instructions 114 can be distributed across multiple processors on the same machine or different machines or across a network, such as a local area network, a wide area network, the Internet, or a combination thereof.

The processor 120 can include any device or system, now-existing or hereafter developed, capable of manipulating or processing a digital signal or other electronic information, including optical processors, quantum processors, molecular processors, or a combination thereof. For example, the processor 120 can include a special-purpose processor, a central processing unit (CPU), a digital signal processor (DSP), a plurality of microprocessors, one or more microprocessors in association with a DSP core, a controller, a microcontroller, an Application Specific Integrated Circuit (ASIC), a Field Programmable Gate Array (FPGA), a programmable logic array, a programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber-optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion-sensing device, or a combination thereof. For example, the sensor 150 may include a sound-sensing device, such as a microphone, or any other sound-sensing device, now existing or hereafter developed, that can sense sounds in the proximity of the computing device 100, such as speech or other utterances, made by a user operating the computing device 100. In another example, the sensor 150 may include a camera, or any other image-sensing device, now existing or hereafter developed, that can sense an image, such as the image of a user operating the computing device. Although a single sensor (i.e., the processor 150) is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160 may be operatively coupled via a bus 170. Although a single bus (i.e., the bus 170) is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof, can be integrated in one or more electronic units, circuits, or chips.

Figure 2:
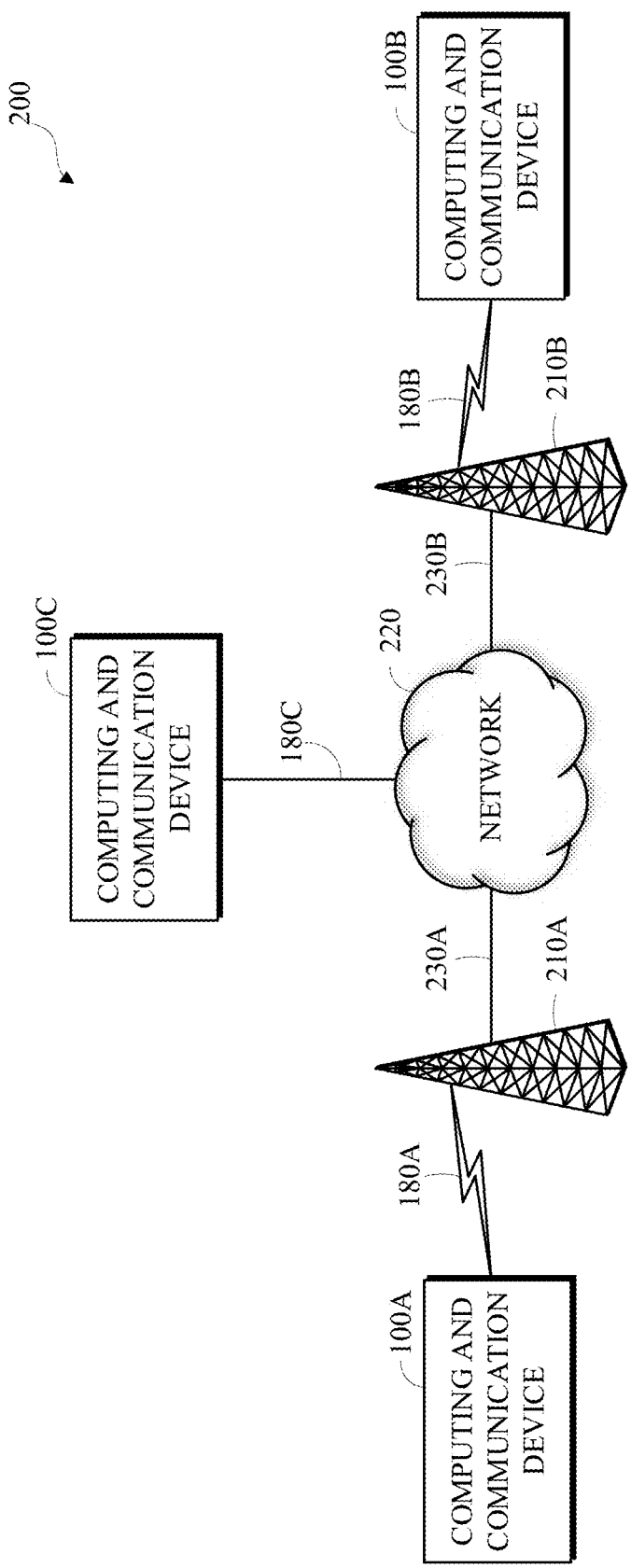
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communications system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, or 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof, audio data; and one, or both, of the computing and communication device 100A and the computing and communication device 100B may receive, decode, process, store, present, or a combination thereof, the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication devices 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the Transmission Control Protocol (TCP), the User Datagram Protocol (UDP), the Internet Protocol (IP), the Real-time Transport Protocol (RTP), the HyperText Transport Protocol (HTTP), or a combination thereof.

The computing and communication devices 100A, 100B, 100C can communicate with each other via the network 220 using one or more wired or wireless communication links, or via a combination of wired and wireless communication links. For example, as shown, the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication devices 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
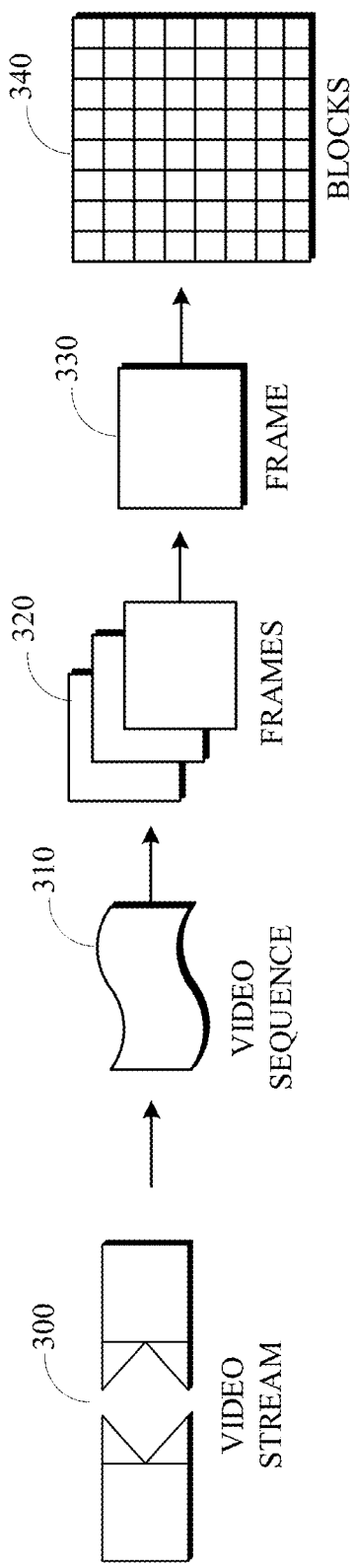
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term "block" can include a superblock, a macroblock, a segment, a slice, or any other portion of a frame. A frame, a block, a pixel, or a combination thereof, can include display information, such as luminance information, chrominance information, or any other information that can be used to store, modify, communicate, or display the video stream or a portion thereof.

In some implementations, a frame that is not part of a video stream is encoded and decoded in accordance with implementations of this disclosure.

Figure 4:
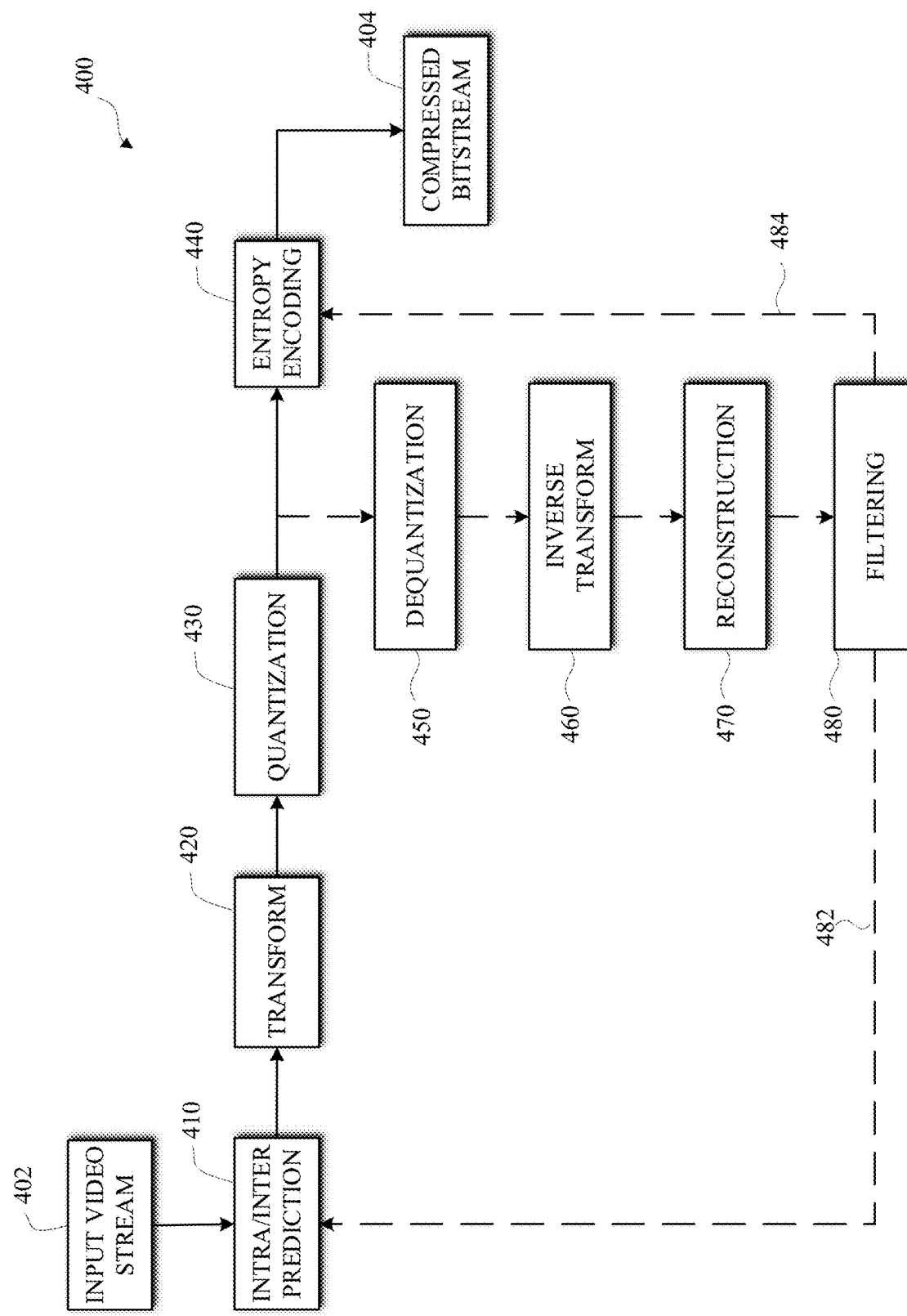
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to encode video data as described herein. The encoder 400 can be implemented as specialized hardware included, for example, in the computing device 100.

The encoder 400 can encode a video stream 402, such as the video stream 300 shown in FIG. 3, to generate an encoded (compressed) bitstream 404. In some implementations, the encoder 400 may include a forward path for generating the compressed bitstream 404. The video stream 402 can be a single image or a collection of images. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame. In the case of encoding a single image (e.g., an image that is not part of a video sequence and/or a sequence of images), the intra/inter prediction unit 410 can encode the image using intra-frame prediction.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), the Fourier transform (FT), the Discrete Sine Transform (DST), and the Asymmetric Discrete Sine Transform (ADST). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
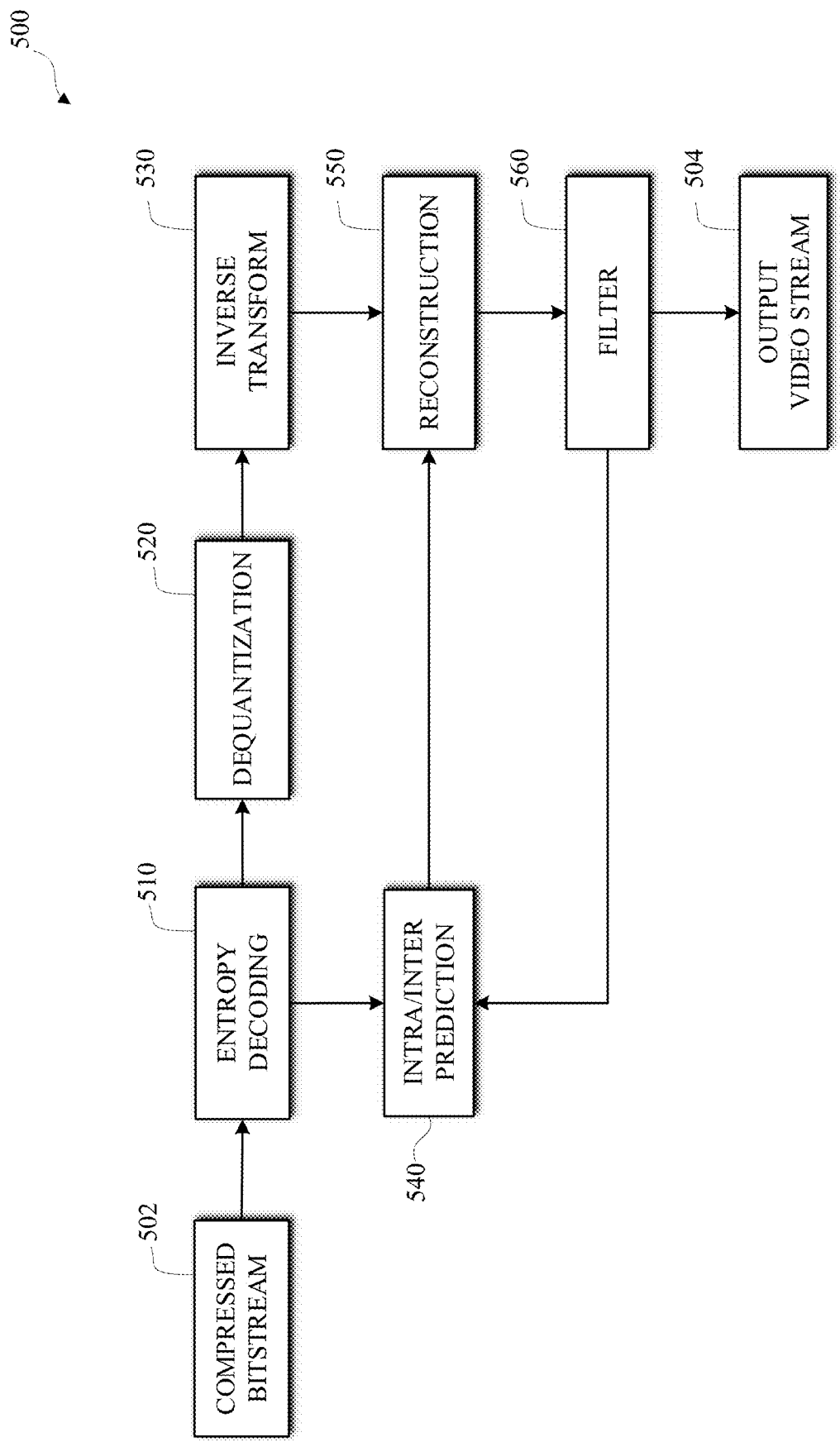
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine-readable instructions that may be executed by a processor, such as the processor 120 shown in FIG. 1, and may cause the device to decode video data as described herein. The decoder 500 can be implemented as specialized hardware included, for example, in the computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
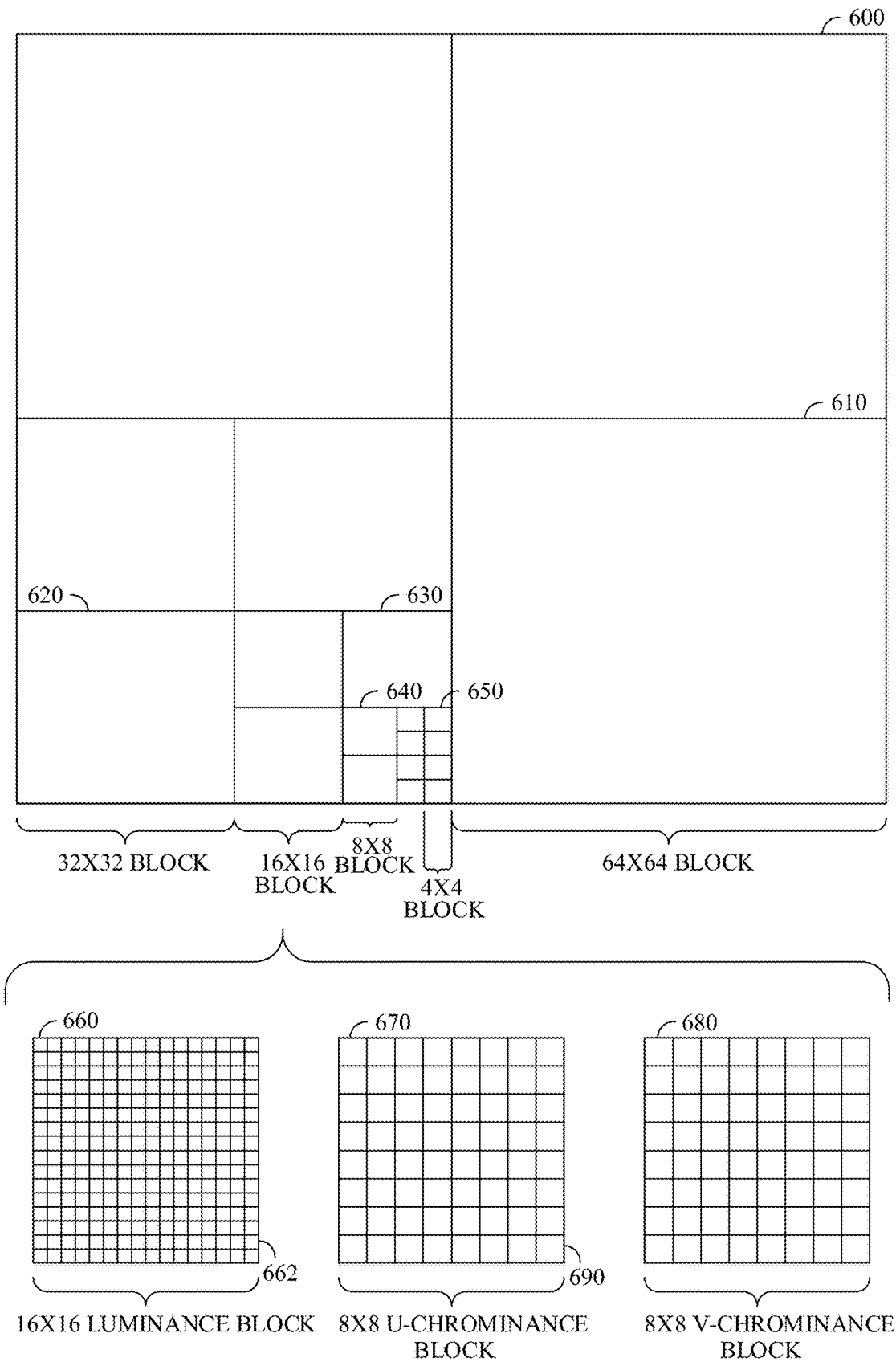
FIG. 6 is a block diagram of a representation of a portion of a frame according to implementations of this disclosure.

FIG. 6 is a block diagram of a representation of a portion 600 of a frame, such as the frame 306 of FIG. 3, or an image, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where N≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, video coding can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame).

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized, and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

The spatial difference between the location of the reference block in the reference frame and the current block in the current frame can be represented as a motion vector. The difference in pixel values between the reference block and the current block can be referred to as differential data, residual data, or as a residual block. In some implementations, generating motion vectors can be referred to as motion estimation, and a pixel of a current block can be indicated based on location using Cartesian coordinates such as $f_{x,y}$. Similarly, a pixel of the search area of the reference frame can be indicated based on a location using Cartesian coordinates such as $r_{x,y}$. A motion vector (MV) for the current block can be determined based on, for example, a SAD between the pixels of the current frame and the corresponding pixels of the reference frame.

Figure 7:
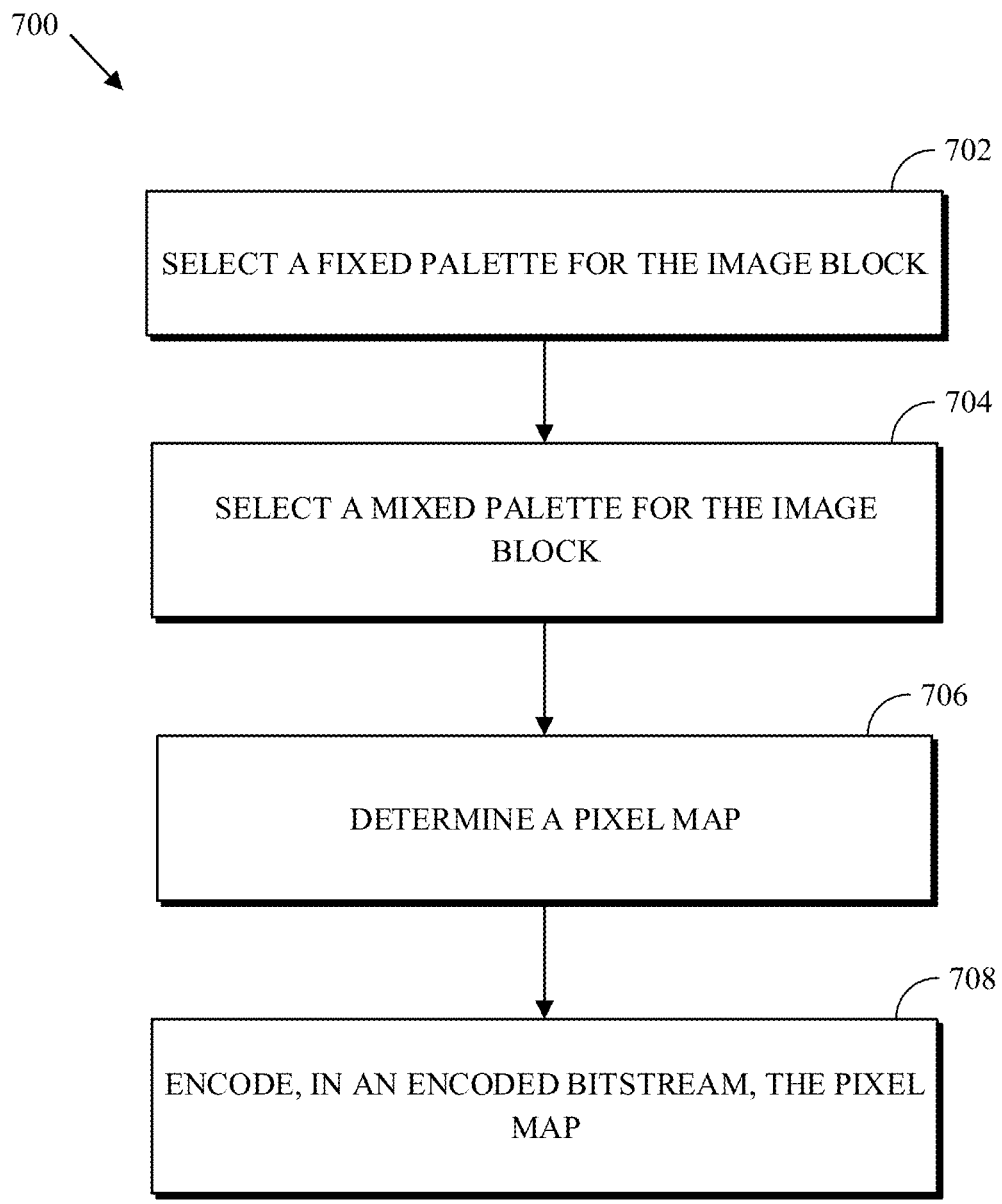
FIG. 7 is a flowchart of a process for encoding an image block using palettization according to implementations of this disclosure.

FIG. 7 is a flowchart of a process 700 for encoding an image block using palettization according to implementations of this disclosure. The process 700 can be implemented, for example, as a software program that may be executed by computing devices such as the computing and communication devices 100A, 100B, 100C. The software program can include machine-readable instructions that may be stored in a memory such as the memory 110, and that, when executed by a processor, such as CPU 120, may cause the computing device to perform the process 700. The process 700 can be implemented (e.g., executed, performed, etc.), in whole or in part, by an encoder, such as the encoder 400 of FIG. 4. The process 700 can be implemented by a prediction unit of the encoder. For example, the process 700 can be implemented by the intra/inter prediction unit 410 of FIG. 4. While the intra/inter prediction unit 410 is described above with respect to inter prediction and intra prediction, the intra/inter prediction unit 410 can additionally perform palette-based prediction as described herein. In another implementation, the palette-based encoding can be implemented by a prediction unit of the encoder 400 that is separate from the intra/inter prediction unit 410.

The process 700 can be used to encode the image block using palette-based encoding. The image block can be a block of an image. The image block can be block of a frame of a video stream. The image block can be a block 340 as described with respect to FIG. 3. The image block can be a coding unit (CU) as described with respect to FIG. 6. The image block can be of size 64×64, 128×128, or any other square or rectangular size.

At 702, the process 700 selects a fixed palette for the image block. As used in this disclosure, "select" means to create, form, produce, determine, use, construct, identify, specify, generate, or other select in any manner whatsoever. The fixed palette can include fixed palette entries.

Figure 8:
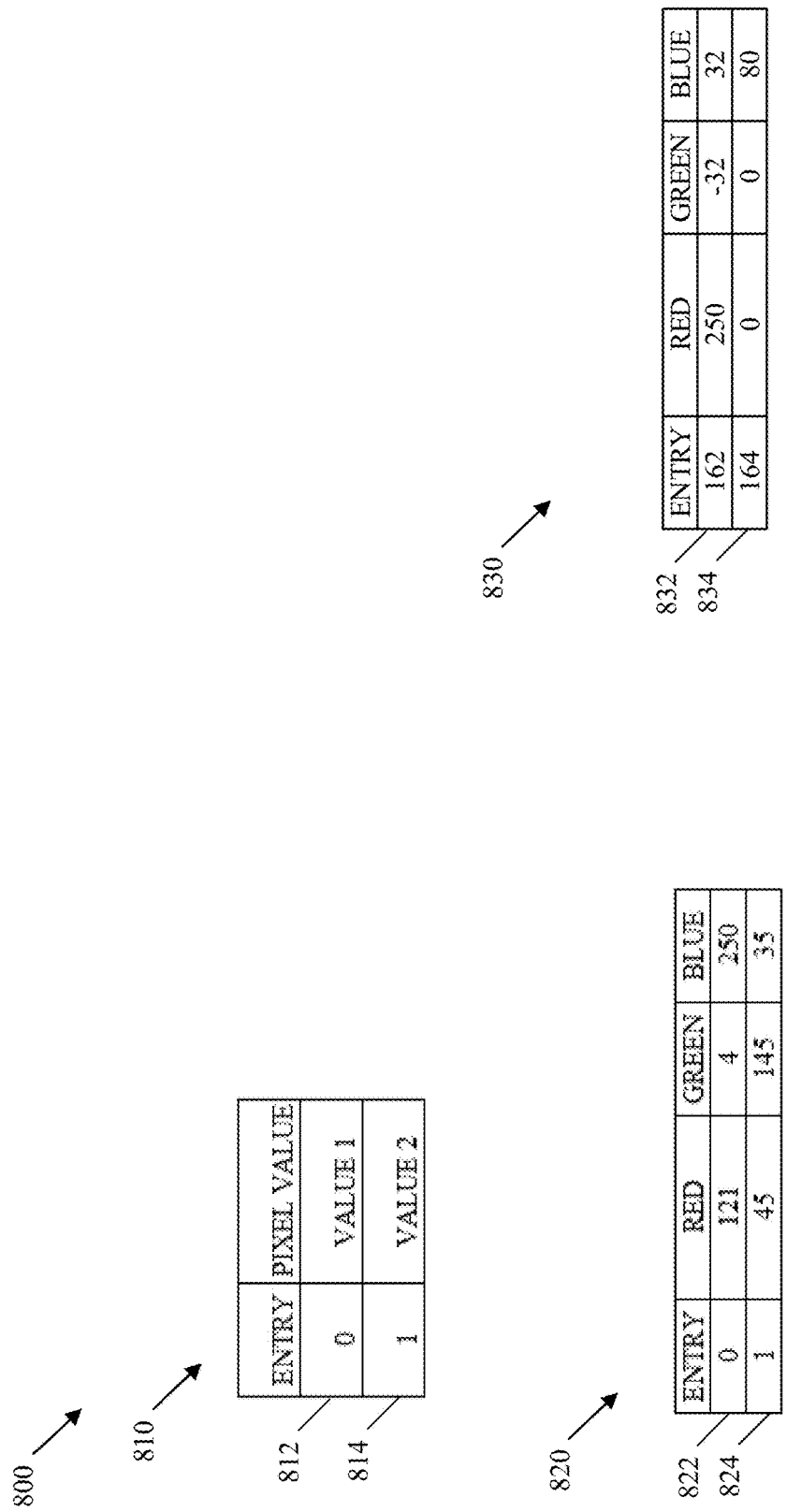
FIG. 8 is an example of palettes according to implementations of this disclosure.

FIG. 8 is an example 800 of palettes according to implementations of this disclosure. The example 800 includes a fixed palette 810. The fixed palette 810 includes fixed palette entries 812 and 814. While only two entries are shown for illustration purposes, a fixed palette can have multiple entries (e.g., 100, 256, or any other number of fixed palette entries). Each fixed palette entry is shown to include an "entry" index and a pixel value (i.e., a color value). For example, the fixed palette entry 812, which has an index or 0, corresponds to a color value "VALUE 1;" and the fixed palette entry 814, which has an index of 1, corresponds to a color value "VALUE 2." While the fixed palette entries 812 and 814 are shown as including respective entry indexes, the indexes can be inferred (such as based on the position of the fixed palette entry in the fixed palette).

The color values VALUE 1 and VALUE 2 of the fixed palette 810 are shown as bine one value each. However, the pixel value (i.e., the color value) can be several values, depending on the color system used. As such, "pixel value" (i.e., "color value") means the values, collectively, of each of the color components of the color model (i.e., the color system) used for the palette. For example, in the case of a monochrome image, the pixel value can be a one greyscale value (e.g., a greyscale pixel value). For example, if the color model used is based on a luminance component (Y) and two chrominance components (U and V, or Cb and Cr), which may be referred to as the YUV or YCbCr color model, or color space, then each of the fixed palette entries can include a Y value, a U value, and a V value. Other color systems can be used. For example, a fixed palette 820 illustrates a case where the RGB color system is used. As such, the pixel value can include several values, each corresponding to a color channel (i.e., the red channel, the green channel, and the blue channel). A fixed palette 822 entry (corresponding, for example, to the fixed palette entry 812) includes a respective value for each of the R, G, and B color channels, namely the values (121, 4, 250); and, similarly, a fixed palette entry 824 (corresponding, for example, to the fixed palette entry 814) includes a respective value for each of the R, G, and B color channels, namely the values (45, 145, 35). The range of the values of the fixed palette entries depends on the number of bits used to represent the value. For example, in a case where 8 bits are used, the values can range from 0 to 255.

In an example, selecting the fixed palette can be performed by analyzing the image block and/or the image containing the image block. In a simple example, a histogram of pixel values of the image block can be generated, and a predetermined number of the top pixel values can be used in the fixed palette. Other known techniques (such as k-means clustering, vector quantization, and the like) can be used to select the fixed palette. In an example, the predetermined number can be 100, 256, or some other value.

In an example, and as further described below, the selected fixed palette can be pruned to include a maximum number of entries (i.e., "maximum fixed palette size"). For example, the fixed palette can initially include 256 colors (i.e., entries) that are later pruned (i.e., reduced) to 100 values (i.e., maximum fixed palette size=100).

In another example, the fixed palette can be a pre-generated palette. For example, generating the fixed palette can be performed in a stand-alone process (e.g., one or more stand-alone processes) that is separate from encoding the image block and/or encoding the image that includes the image block. For example, the stand-alone process can analyze many different types of images and determine for the different types of images respective fixed palettes. For example, the stand-alone process can determine respective fixed palettes for photographic images, graphical images, mixed images (e.g., images containing photographic and graphical content), other types of images, or combinations thereof. In an example of such stand-alone process, k-means clustering can be performed on the colors of a large corpus of images that are of a certain type in order to identify one or more palettes that are suitable for images of that type.

At 704 of FIG. 7, the process 700 selects a mixed palette for the image block. The mixed palette includes mixed palette entries. Each mixed palette entry can be thought of as a recipe for manipulating a given color value. A mixed palette 830 of FIG. 8 includes mixed palette entries 832 and 834. As described above, the numbers in each of the mixed palette entries describe deltas (e.g., offsets, percentages, etc.) to be applied to a given color.

For example, given a color value of (RED=34, GREEN=24, BLUE=125), manipulating the color value using the mixed palette entry 832 results in a new color value (RED=34+250, GREEN=24−32, BLUE=125+32). When applying the deltas, a value that exceeds a maximum possible value can be set to the maximum possible value. For example, if 8 bits are used to represent a color value, then the maximum possible value is 255. As such, as 34+250 exceeds the maximum possible value, the RED component is set to 255. Similarly, if applying the delta to a color component results in a negative value, the value can be set to 0. As such, the GREEN component is set to zero. Accordingly, the resulting color is (RED=255, GREEN=0, BLUE=157).

As mentioned, the deltas can also be percentages. As such, given the color value of (RED=34, GREEN=24, BLUE=125), and the mixed palette entry (RED=50, GREEN=120, BLUE=200), the resulting mixed value is (RED=34*50%, GREEN=24*120%, BLUE=125*200%)=(RED=17, GREEN=29, BLUE=250).

In the case that the mixed palette uses the YUV color system, the mixed palette entries can include a luminance delta only. That is, the mixed palette entries can include intensity offsets only. In another example, the mixed palette entries can include luminance and chrominance color entries. In another example, the mixed palette entries can include luminance and/or chrominance deltas, which can be converted to red, green, and blue deltas. Conversion between color systems is well known. For example, the National Television Standards Committee (NTSC) defines the equations Y=0.299 R+0.5876 G+0.114 B, U=Y−B, and V=Y−R for converting from the RGB system to the YUV color system.

Figure 9:
FIG. 9 is an example of a mixed palette according to implementations of this disclosure.

FIG. 9 is an example of a mixed palette 900 according to implementations of this disclosure. The mixed palette 900 is shown as including mixed entries having indexes 101 to 325. For example, in a case where a fixed palette includes fixed entries 1-100, the mixed palette can include succeeding entries starting at the index of the last fixed entry (e.g., 100) plus 1.

As further described below, a mixed palette entry can be indicative of a mixing of (e.g., a method of combining the values of) pixels in a neighborhood of a pixel. The pixels in a neighborhood of a pixel that are to be combined can be referred to as neighboring pixels. The deltas of a mixed palette entry constitute the manipulation of the mixing of the pixel neighborhood.

Figure 10:
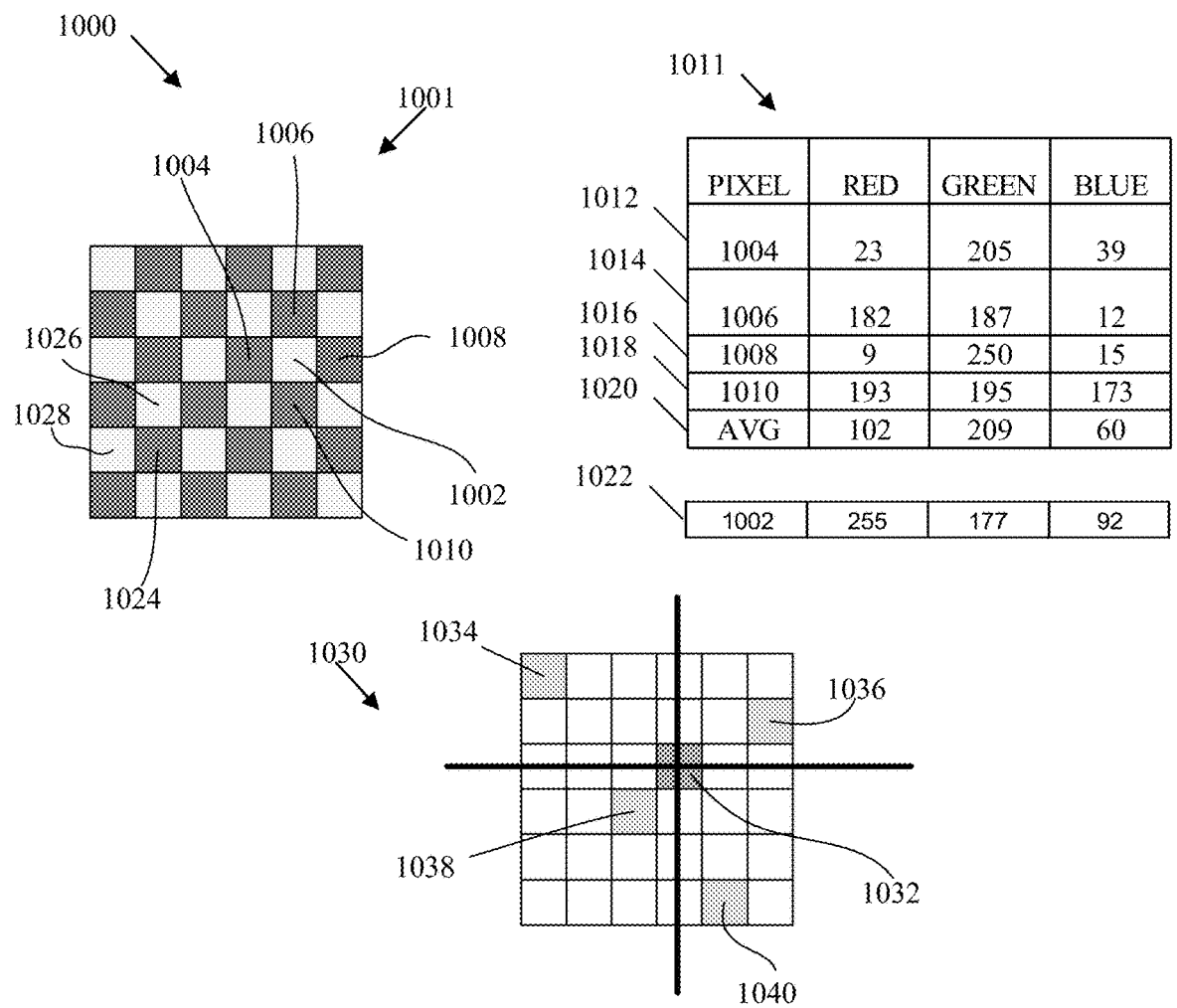
FIG. 10 is an example of an illustration of mixing according to implementations of this disclosure.

FIG. 10 is an example 1000 of an illustration of mixing according to implementations of this disclosure. The example 1000 includes a portion 1001 of an image block. The portion 1001 is shown as being 6×6 pixels for illustration purposes. The portion 1001 includes a pixel 1002. The example 1000 illustrates using mixing to determine (e.g., calculate, derive, etc.) a value for the pixel 1002.

In the example 1000, for mixing purposes, the neighborhood of the pixel 1002 is composed of pixels 1004-1010. That is, for mixing purposes, the neighboring pixels of the pixel 1002 are the pixels 1004-1010. A table 1011 shows illustrative pixel values of the pixels 1004-1010 in the RGB color space. Rows 1012-1018 show, respectively, the RGB values of the pixels 1004-1010. The portion 1001 is shown in a checkerboard pattern in which light-colored pixels, such as the pixels 1004-1010, correspond to pixel values that are not determined using mixing. That is, the values of the pixels 1004-1010 can be determined using, for example, fixed palette entries.

In an implementation, the method of combining the values of the neighboring pixels can be fixed. For example, the method of combining can be to average the neighboring pixels. A row 1020 shows the rounded averages of each of the color components of the pixels 1004-1010. In another example, the method of combining the neighboring pixels can be a weighted average such that the distance (e.g., the Euclidian distance) of a neighboring pixel from the pixel 1002 can be used in determining the weighted average. A row 1022 shows the result of manipulating the row 1020 using the palette entry 832 of FIG. 8. As such, the color value (RED=max(102+250,255), GREEN=209−32, BLUE=60+32)=(255, 177, 92) can be assigned to the pixel 1002.

In an example, the index (i.e., the position) of the mixing palette entry in the mixing palette can be indicative of the neighboring pixels to be used. For example, some mixing palette entries can correspond to combining a top neighbor with a left neighbor of a pixel, when a raster scan order is used to process the pixels of the image block. For example, to determine a color value of a pixel 1024, a top pixel 1026 (i.e., an adjacent and above pixel) and a left pixel 1028 (i.e., an adjacent and to the left pixel) can be combined using a combining method. The combined value of the top and the left pixels can then be manipulated using the deltas of the mixing palette entry. In another example, the neighboring pixels can indicate only the left pixel. If the sum of errors is smaller than encoding using the fixed palette entry, then the fixed palette entry is removed. Additionally, for each location of the pixel map that uses the fixed palette entry, the fixed palette index is replaced with the mixed palette entry index corresponding to the smallest error for that pixel map location.

In another example, the neighboring pixels can indicate only the top pixel. In another example, some mixing palette entries can correspond to using a sort-search to determine the neighboring pixels to be used. An image portion 1030 is used to illustrate a sort-search for determining the neighboring pixels. Given a pixel 1032, a value of which is to be determined using mixing, quadrants of pixels can be used to determine the neighboring pixels. For example, a northwest, a north-east, a south-west, and a south-east quadrant can be used. In each of the quadrants, a closest pixel to the pixel 1032 is determined. The closest pixel is a pixel in the quadrant that does not use mixing. That is, the closest pixel can be a pixel that corresponds to a fixed palette entry, as described below with respect to the pixel map. Closeness can be determined based on Euclidian distance. As such, a pixel 1034 illustrates a closest pixel in the north-west quadrant; a pixel 1036 illustrates a closest pixel in the north-east quadrant; a pixel 1038 illustrates a closest pixel in the south-west quadrant; and a pixel 1040 illustrates a closest pixel in the south-east quadrant. The pixels 1034-1040 can be used as the neighboring pixels as described above. In an example, if a quadrant includes more than one closest pixels, one of closest pixels can be selected as the closest pixel. Alternatively, an average of the one or more than one closest pixels can be used as the closes pixel in that quadrant. Other ways of combining or selecting from the one or more than one closest pixels can be available.

In an example, the mixing palette that is used for encoding (and decoding as later described) can include 170 entries. The mixing entries corresponding to indexes 100-119 can correspond to using four neighboring pixels. The four neighboring pixels can be as described with respect to the pixel 1002 or the pixel 1032. Other ways of determining the four neighboring pixels can be available. The mixing entries corresponding to indexes 120-169 can use the top and left neighboring pixels, such as described with respect to the pixel 1024. Palette entries corresponding to indexes 0-99 can be fixed palette entries.

In the examples herein, for ease of explanation, all mixed palette entries are described as being included in one mixed palette and that the position of a mixed palette entry can be indicative of a pixel neighborhood, a mixing method, manipulation deltas, or a combination thereof. However, it is to be understood that the mixed palette can be multiple mixed palettes. For example, a first mixed palette can be for averaging a top neighbor and a left neighbor and manipulating the mixed value using the deltas of the mixed palette entries first mixed palette; a second mixed palette can be for averaging the neighboring pixels, based on a checker-board pattern, and manipulating the mixed value using the deltas of the mixed palette entries second mixed palette; and so on.

Referring to FIG. 7 again, at 706, the process 700 determines a pixel map. As used in this disclosure, "determine" means to create, form, produce, select, use, construct, identify, calculate, specify, generate, or other determine in any manner whatsoever. The pixel map includes, for a pixel of at least some pixels of the image block, a respective mapping to one of a fixed palette entry or a mixed palette entry. For example, the pixel map includes, for each pixel of the image block, a corresponding value such that the corresponding value is an index of a fixed palette entry or a mixing palette entry. For simplicity of explanation, the values of the pixel map are used as indexes into either a fixed palette or a mixed palette. In an example, at least some of the values of the pixel map can be symbols that can be indicative of the respective palette entries.

Figure 11:
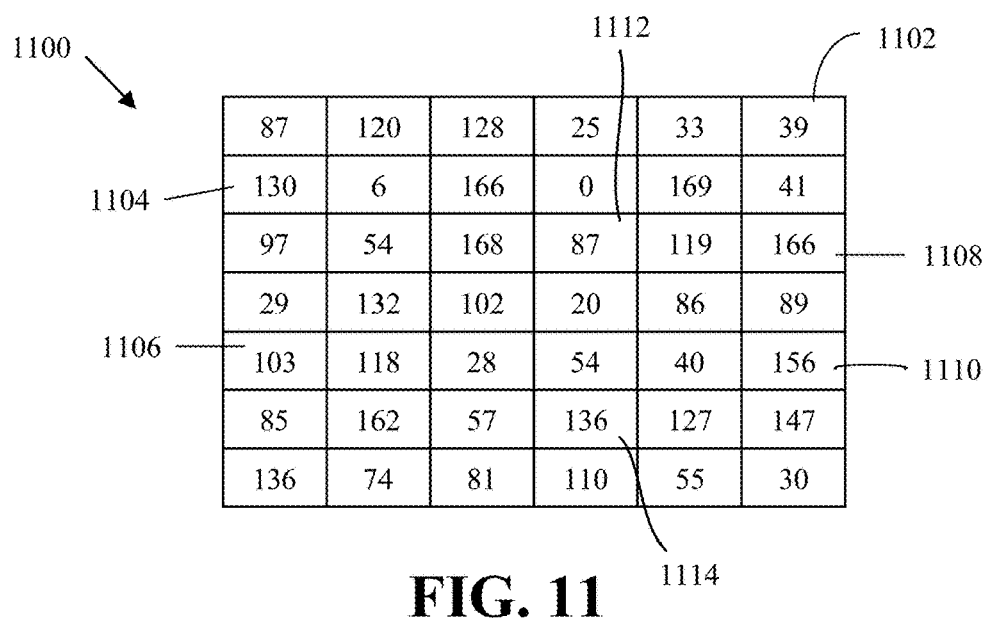
FIG. 11 is an example of an illustration of a pixel map according to implementations of this disclosure.

FIG. 11 is an example 1100 of an illustration of a pixel map according to implementations of this disclosure. The example 1100 can be a pixel map for a portion of an image that is 6×6 pixels. Using the example described above where the fixed palette includes 100 fixed palette entries (e.g., fixed palette entries with indexes 0-99) and 170 mixed palette entries (e.g., mixed palette entries with indexes 100-169), the example 1100 illustrates that each of the entries is a number between 0 and 169, inclusive. The pixel map 1100 indicates, for each pixel, which color (i.e., a fixed color from the fixed palette or a mixed color from the mixed palette) is used to encode (by the encoder) and decode (by a decoder) a color value for that pixel.

An index 1102 of the pixel map 1100 indicates that the color value corresponding to the fixed palette entry at index 39 of the fixed palette is used for coding the co-located pixel of the image block. Similarly, the indexes 1104, 1106, 1108, and 1110 correspond, respectively, to a mixing palette entry at index 130, a mixing palette entry at index 103, a mixing palette entry at index 166, and a mixing palette entry at index 156.

Referring again to FIG. 7, determining the pixel map can include processing, in a scan order, each pixel of the image block and determining a palette index to use for encoding the pixel. The palette index can be, as indicated above, an index of a fixed palette entry or an index of a mixing palette entry.

As indicated above, determining the pixel map can include mapping the pixel to a mixed palette entry corresponding to (i.e., being indicative of) at least one of the pixel neighborhood being neighboring pixels of a pixel, the mixing of the pixel neighborhood being an average of neighboring pixels, the manipulation of the mixing of the pixel neighborhood corresponding to adding a color delta to a color component of the mixing of the pixel neighborhood, or a combination thereof.

In an example, and as described above, the neighboring pixels can be (e.g., can include) a top neighboring pixel and a left neighboring pixel of the pixel of the image block. In another example, and as also described above, neighboring pixels are pixels of the image block that are determined based a checker-board pattern. As such, the process 700 can, in determining the pixel at 706, enforce a constraint such that at least every other pixel location must be mapped to a fixed palette entry. As such, while two consecutive (or adjacent) pixel locations can be mapped to fixed palette entries in the pixel map, no two adjacent pixel locations can be mapped to mixed palette entries. As such, in a case where no two adjacent pixel locations can be mapped to fixed palette entries, a checker-board pattern, such as shown in the portion 1001, results. In the checker-board pattern, each pixel location that is mapped to a fixed palette entry has four neighboring pixel locations (i.e., a top, left, bottom, and right neighboring pixels), each mapped to a mixed palette entry; and each pixel location that is mapped to a mixed palette entry has four neighboring pixel locations, each mapped to a fixed palette entry. In an example, the process 700 can include determining the neighboring pixels using a sort-search, as described above.

In an implementation, neighboring pixels can include pixels peripheral to (i.e., from outside) the image block. That is, the neighboring pixels can include pixels from neighboring (i.e., adjacent) image blocks. For example, assume that a pixel is on the left edge of the image block. As such, the left neighbor can be a pixel on the right edge of the adjacent image block. Using pixels from adjacent blocks as neighboring pixels may reduce blocking artefacts effects. In other implementations, neighboring pixels can only be pixels in the image block itself.

In an example, determining the pixel map at 706 can be a multi-step process that can also include palette pruning, which is mentioned above. For example, an initial fixed palette of a first size (e.g., 256) can be selected based, for example, on one of the above-mentioned techniques, such as using a histogram, k-means clustering, or the like.

In the first step, each of the pixel values of the image block is mapped to a color (e.g., an entry) of the initial fixed palette. In the second step, the fixed palette, having a second size that is smaller than the first size, is determined by removing some of the entries (i.e., colors) from the initial palette and re-assigning pixels assigned to those colors to one of the mixed palette entries.

For example, to determine whether the color of the initial fixed palette is to be removed, the process 700 can compare the error that results from keeping the color and the error that results from removing the color. An error can be calculated for every pixel that uses the color and a total sum of errors is calculated as the sum of all the errors. The error associated with a pixel can be calculated as follows. For each of the mixed palette entries, a respective color (i.e., a respective manipulated value) is calculated according to the mixed palette entry (i.e., determining neighboring colors, mixing the values of the neighboring pixels, and manipulating the mixed value according to the mixed palette entry deltas). The smallest of the respective errors can be selected as the error associated with the pixel. In an example, the error can be calculated as the Euclidean distance of the color components of the manipulated color and the original color value of the image block.

If the sum of all the smallest of the respective errors (i.e., the sum of the smallest errors of the pixels that use the fixed palette color) is smaller than the error of using the fixed palette entry, then the fixed palette color is removed from the fixed palette, and the fixed palette index in the pixel map is replaced, for each pixel described above, with the index of the mixed palette entry corresponding to the smallest error for that pixel; otherwise, the fixed palette entry is not removed from the fixed palette and the pixel map is not changed. Other techniques can be available for pruning the fixed palette.

At 708, the process 700 encodes, in an encoded bitstream, the pixel map. The encoded bitstream can be the compressed bitstream 404 of FIG. 4. Any suitable encoding technique can be used to encode the pixel map in the encoded bitstream. In an example, run-length encoding can be used to encode the values of the pixel map in the encoded bitstream. In an example, entropy coding can be used to encode the entries of the pixel map. For example, the values of previously (i.e., in a scan order) encoded pixel map entries can be used as a context for determining a probability distribution for encoding a current entry.

In an example, encoding, in the encoded bitstream, the pixel map can include encoding, in the encoded bitstream, the mixed palette. That is, the delta values of each of the entries of the mixed palette can be encoded in the encoded bitstream. Any suitable encoding technique can be used. As mentioned above, the indexes of the entries need not be encoded in the bitstream since the indexes can be inferred based on the order of the entries in the encoded bitstream.

In an example, the mixed palette is not encoded in the bitstream. For example, in a case where the encoder and the decoder use the same mixing palette entries, the encoder need not encode the mixing palette entries in the bitstream.

Figure 12:
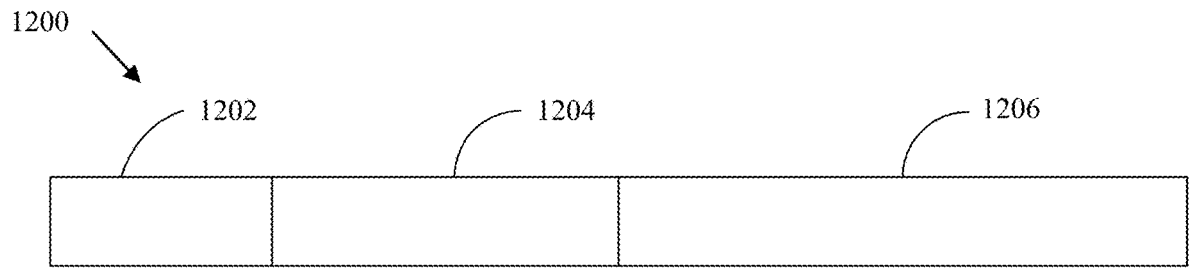
FIG. 12 is an illustration of a diagram of an encoded bitstream according to implementations of this disclosure.

FIG. 12 is an illustration of a diagram of an encoded bitstream 1200 according to implementations of this disclosure. The encoded bitstream 1200 can be a portion of a compressed bitstream, such as the compressed bitstream 404 of FIG. 4. The encoded bitstream 1200 includes a portion 1202 that includes (e.g., encodes) the fixed palette entries of a fixed palette, a portion 1204 that includes (e.g., encodes) the mixed palette entries of a mixed palette, and a portion 1206 that includes (e.g., encodes) the values (i.e., the indexes) of the pixel map.

As indicated above, in some implementations, the portion 1204 can be omitted. Similarly, in some examples, the portion 1202 may be omitted from the encoded bitstream 1200. In a situation where the encoder and the decoder use the same pre-determined palette, the fixed palette need not be communicated to the decoder in a the encoded bitstream. In situations where the encoder and the decoder may use one of several pre-determined palettes, the encoder can indicate, in the encoded bitstream which of the pre-determined palettes the decoder is to use. For example, the encoder can communicate, via a syntax element, an index and/or a label indicative of the pre-determined palette that the encoder is to use. As an illustrative example, three pre-determined palettes may be available, and an image of size 256×256 pixels may be partitioned into 16 image blocks each of size 64×64 pixels. The encoder may indicate that the first palette is to be used for a first image block; that the second palette is to be used for five of the 16 image blocks; that the third palette is to be used for three of the 16 image blocks; and that the remaining seven image blocks are not palette-encoded (i.e., the seven remaining image blocks are either intra predicted, inter predicted, or a combination thereof). In another example, the decoder may be able to infer the pre-determined palette to use. As such, the syntax element can be omitted.

Figure 13:
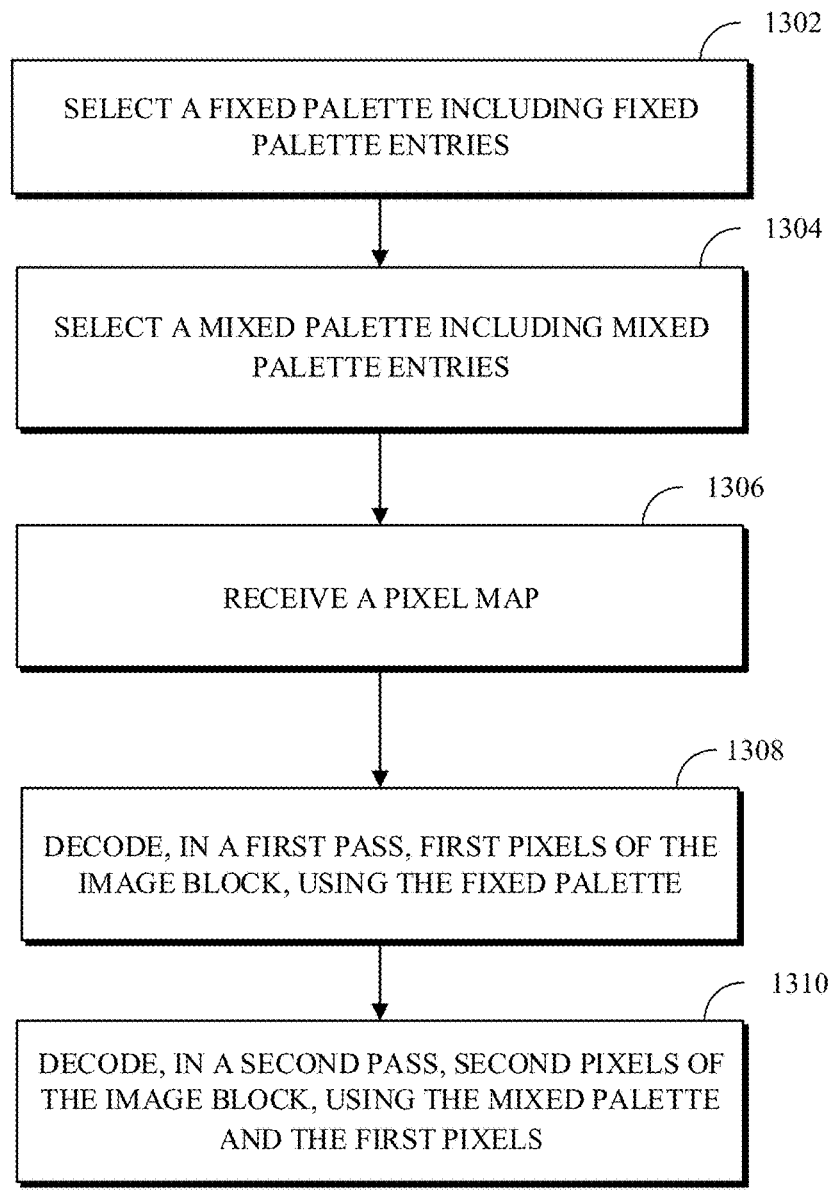
FIG. 13 is a flowchart of a process for decoding an image block using palettization according to implementations of this disclosure.

FIG. 13 is a flowchart of a process 1300 for decoding an image block using palettization according to implementations of this disclosure. The process 1300 can be implemented, for example, as a software program that may be executed by computing devices such as the computing and communication devices 100A, 100B, 100C. The software program can include machine-readable instructions that may be stored in a memory such as the memory 110, and that, when executed by a processor, such as CPU 120, may cause the computing device to perform the process 1300.

The process 1300 can be implemented (e.g., executed, performed, etc.), in whole or in part, by a decoder, such as the decoder 500 of FIG. 5. The process 1300 can be implemented by a prediction unit of the decoder. For example, the process 1300 can be implemented by the intra/inter prediction unit 540 of FIG. 5. While the intra/inter prediction unit 540 is described above with respect to inter prediction and intra prediction, the intra/inter prediction unit 540 can additionally perform palette-based prediction as described herein. In another implementation, the palette-based decoding can be implemented by a prediction unit of the decoder 500 that is separate from the intra/inter prediction unit 540. The process 1300 can be performed in reconstruction path of an encoder, such as described by the reconstruction path of FIG. 4.

The process 1300 can be used to decode the image block using palette-based decoding. The image block can be a block of an image. The image block can be block of a frame of a video stream. The image block can be a block 340 as described with respect to FIG. 3. The image block can be a coding unit (CU) as described with respect to FIG. 6.

At 1302, the process 1300 selects a fixed palette. The fixed palette includes fixed palette entries. The fixed palette can be as described with respect to the fixed palette 810 of FIG. 8. In an example, the process 1300 selects the fixed palette by decoding the fixed palette from a compressed bitstream. For example, the bitstream can be as described with respect to encoded bitstream 1200 of FIG. 12 and the fixed palette can be decoded from the portion 1202 of FIG. 12. In another example, the process 1300 selects the fixed palette based on the type of image that includes the image block. As such, the fixed palette can be a pre-generated palette, such as described with respect to FIG. 7.

At 1304, the process 1300 selects a mixed palette. The mixed palette includes mixed palette entries. The mixed palette can be as described with respect to the mixed palette 830 of FIG. 8. In an example, the process 1300 selects the mixed palette by decoding the mixed palette from the compressed bitstream. For example, the mixed palette can be decoded from the portion 1204 of FIG. 12. As such, selecting the mixed palette can include receiving the mixed palette in the compressed bitstream. In another example, such as in a case where the encoder and the decoder use the same mixing palette entries, the mixed palette may not be included in the encoded bitstream and the process 1300 can select a pre-determined mixing palette. In another example, the process 1300 decodes an indicator of the pre-determined mixing palette. For example, the process 1300 can have available more than one pre-determined mixing palettes. As such, the process 1300 can receive, in the encoded bitstream, an indication of the one of the more than one pre-determined mixing palettes to select. As indicated above, a mixed palette entry can correspond to a pixel neighborhood, a mixing of the pixel neighborhood, a manipulation of the mixing of the pixel neighborhood, or a combination thereof. Selecting a mixed palette can include selecting multiple mixed palettes as described above.

At 1306, the process 1300 receives a pixel map. The pixel map can be received in the encoded bitstream. As such, the process 1300, or another module of a decoder, can decode the pixel map from the encoded bitstream. The decoded pixel map can then be received by the process 1300. The pixel map can be as described with respect to pixel map described with respect to FIG. 11. As such, the pixel map can include, implicitly or explicitly, for each pixel of the image block a corresponding palette index. The corresponding palette index can be an index of a fixed palette entry or can be an index of a mixed palette entry.

The process 1300 uses the pixel map to reconstruct (e.g., decode, reconstitute, etc.) the image block. That is, the process 1300 can process, for example in a raster scan order, each value in the pixel map to determine a color value to use for a pixel at a corresponding location in the image block. Said another way, the process 1300 assigns a color value to a pixel location of the image block based on the corresponding (i.e., co-located) index in the pixel map.

As described above, an index that corresponds to a fixed palette entry corresponds directly to a color value. However, an index that corresponds to a mixed palette entry may require that neighboring pixels that are after a current pixel in the scan order be decoded first. For example, and as described with respect to FIG. 10, decoding (e.g., assigning a value to) the pixel 1002, first requires that the values of pixels 1008 and 1010, which are after the pixel 1002 in the raster scan order, be known. As such, the value of the pixel 1002 cannot be determined when the pixel 1002 is visited in the raster scan order. Similarly, a color value cannot be assigned to (e.g., determined for, calculated for, etc.) the pixel 1032 before the color values of the pixels 1038 and 1040 are known. As such, the process 1300 can use two passes to assign a respective color value to each pixel of the image block.

At 1308, the process 1300 decodes, in a first pass, first pixels of the image block, using the fixed palette. The first pixels are those pixels of the image block that are encoded using entries of the fixed palette. That is, in the first pass, the process 1300 assigns color values to those pixels of the image block that use indexes of the fixed palette. An example of an implementation of the first pass is described with respect to FIG. 14.

Figure 14:
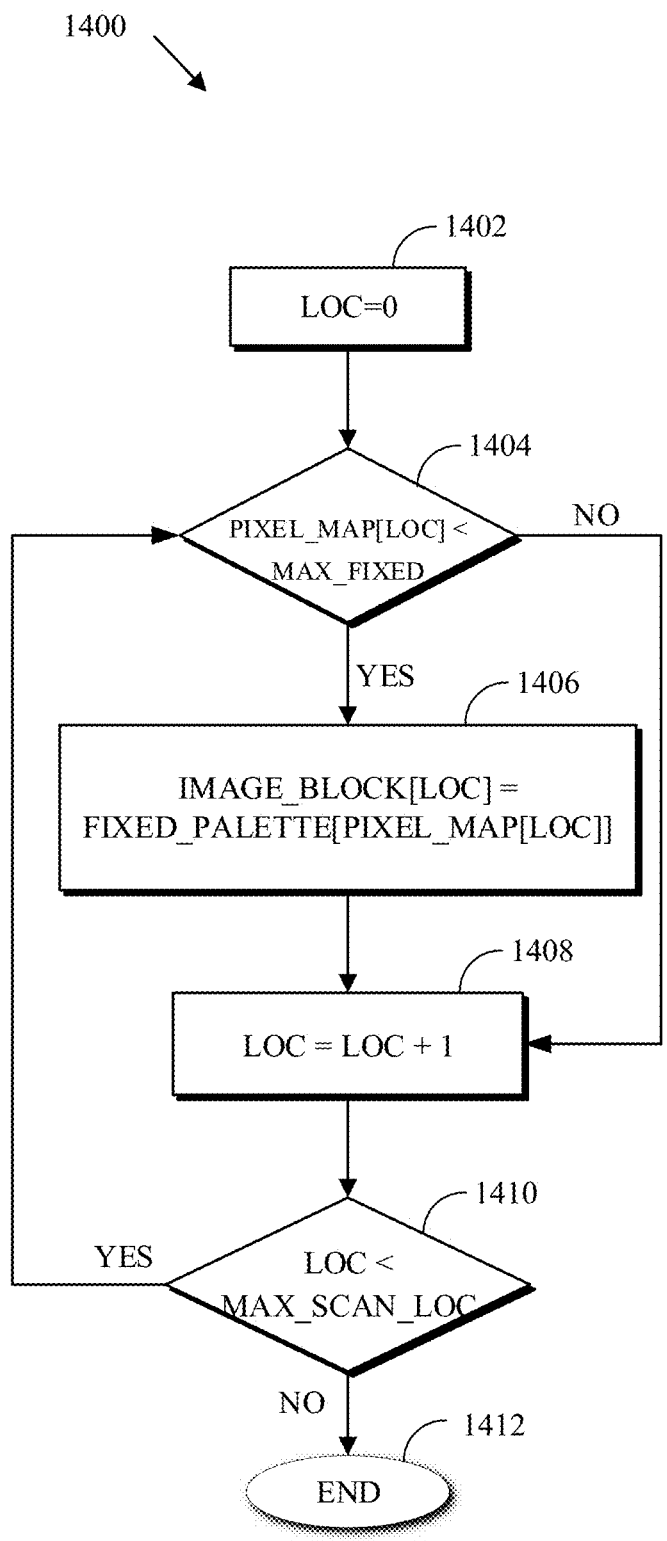
FIG. 14 is a flowchart of a process of a first pass for decoding an image block using a pixel map according to implementations of this disclosure.

FIG. 14 is a flowchart of a process 1400 of a first pass for decoding an image block using a pixel map according to implementations of this disclosure. The process 1400 can be used by the process 1300 at 1308. The process 1400 traverses, in a raster scan order, each value of the pixel map and, if the value at a current location is an index into the fixed palette, then the process 1400 assigns the color value indicated by the index from fixed palette to the corresponding pixel in the image block. In the description of the process 1400, the fixed palette includes MAX_FIXED entries; the fixed palette entries are indexed from 0 to MAX_FIXED-1; the pixel map is denoted PIXEL_MAP; and the image block is denoted IMAGE_BLOCK.

While, the pixel map and the image block are usually denoted as being two-dimensional arrays, for simplicity of explanation, they are denoted here as being one-dimensional arrays. A person skilled in the art can appreciate that a scan location can be converted to a two-dimensional Cartesian coordinate, and vice versa. Additionally, while the description below refers to a pixel (color) value, it is to be understood that the pixel (color) value is to be interpreted as including the values of each color component of the color system used in the palette entries.

At 1402, the process 1400 assigns a loop variable LOC to zero. The loop variable LOC corresponds to a scan location in the raster scan order. If the image block is of size M×N, then the maximum scan location (i.e., MAX_SCAN_LOC) is M*N-1. At 1404, the process 1400 tests whether the pixel at scan location LOC is encoded using a color value from the fixed palette. That is, at 1404, the process 1400 tests whether the index in the pixel map at the current scan location LOC (i.e., PIXEL_MAP[LOC]) is between 0 and MAX_FIXED (i.e., PIXEL_MAP[LOC]<MAX_FIXED). If so, the process 1400 proceeds to 1406; otherwise the process 1400 proceeds to 1408, thereby skipping assigning a color value to the pixel at scan location LOC because the pixel is not encoded using a fixed palette entry.

At 1406, the process 1400 assigns, to the pixel at scan location LOC in the image block (i.e., IMAGE_BLOCK[LOC]), the color value of the fixed palette that is at the index specified by pixel map at location LOC. That is, the process 1400 sets IMAGE_BLOCK[LOC] to FIXED_PALETTE[PIXEL_MAP[LOC]]. At 1408, the process 1400 updates the loop variable in preparation for processing the next scan location. At 1410, the process 1400 tests whether all scan locations of the image block have been processed. If so, the process 1400 ends at 1412; otherwise the process 1400 proceeds back to 1404.

Returning to FIG. 13, at 1310, the process 1300 decodes, in a second pass, second pixels of the image block, using the mixed palette and the first pixels. The second pixels are those pixels of the image block that are encoded using entries of the mixed palette. That is, in the second pass, the process 1300 assigns color values to those pixels of the image block that use indexes of the mixed palette. An example of an implementation of the second pass is described with respect to FIG. 15.

In an example, decoding, in the second pass, the second pixels of the image block, using the mixed palette and the first pixels can include determining, for a second pixel of the second pixels, a mixed palette entry; determining, based on the mixed palette entry, the pixel neighborhood of the second pixel, the pixel neighborhood being a group of pixels from the first pixels; mixing the group of pixels by combining the values of the group of pixels to generate a mixed pixel value (i.e., a mixed value); and applying, based on the mixed palette entry, a delta offset to a color component of the mixing pixel value to generate the second pixel. In an example, and as described above, the group of pixels can include a top neighboring pixel and a left neighboring pixel of the second pixel. In another example, and as also described above, the group of pixels can be determined using a checkerboard pattern of the image block. In yet another example, the group of pixels can be determined using sort-search.

Figure 15:
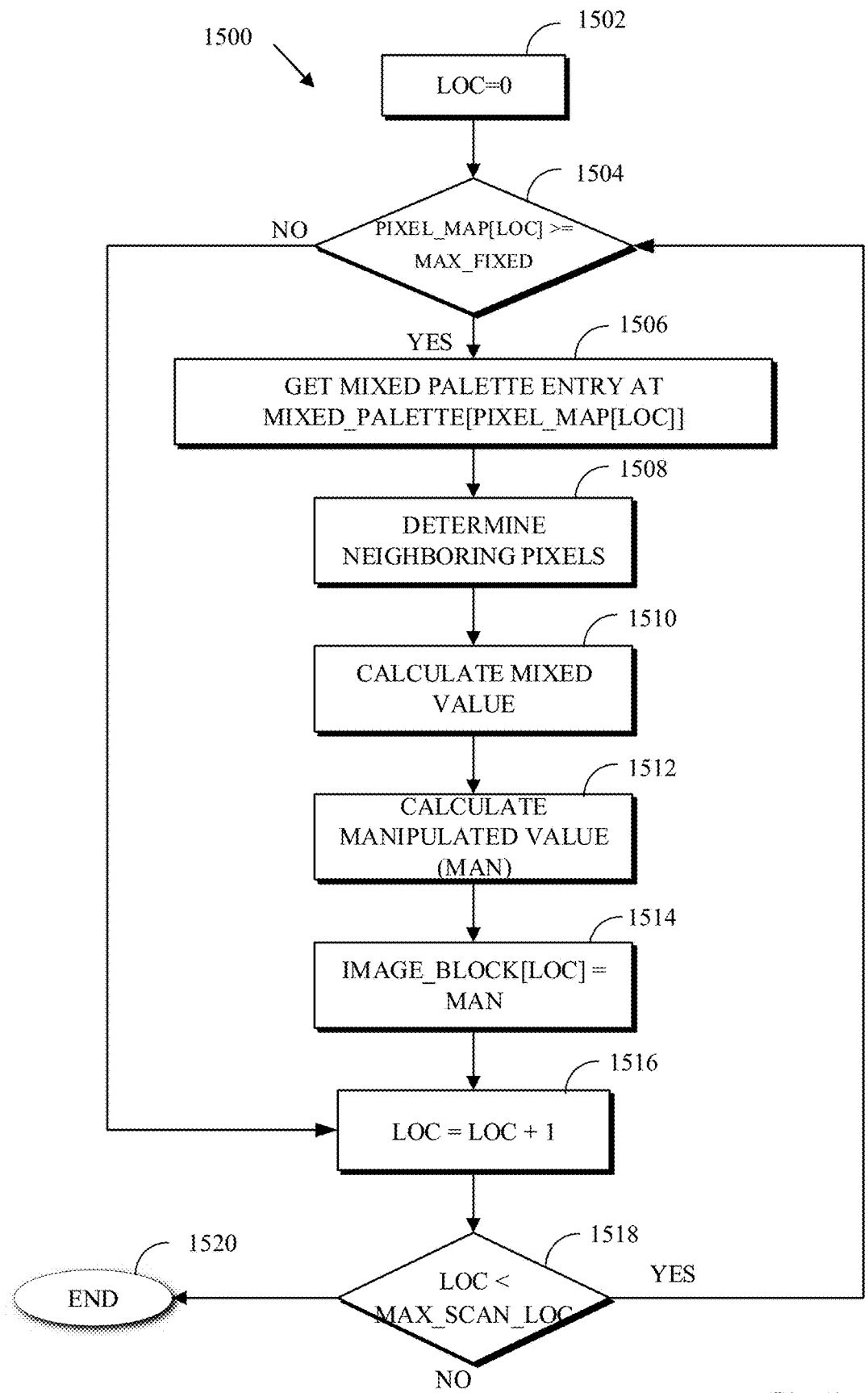
FIG. 15 is a flowchart of a process of a second pass for decoding an image block using a pixel map according to implementations of this disclosure.

FIG. 15 is a flowchart of a process 1500 of a second pass for decoding an image block using a pixel map according to implementations of this disclosure. The process 1500 can be used by the process 1300 at 1310. The process 1500 traverses, in a raster scan order, each value of the pixel map and, if the value at a current location is an index into the mixed palette, then the process 1500 determines, based on the index of the mixed palette entry, neighboring pixels of the current pixel; mixes the values of the neighboring pixels based on the index of the mixed palette entry, resulting in a mixed value; manipulates the mixed value according to the deltas of the mixed palette entry, resulting in a manipulated value; and assigns the manipulated value to the image pixel.

In the following description of the process 1500, pixel value, color value, LOC, MAX_FIXED, PIXEL_MAP, IMAGE_BLOCK, and MAX_SCAN_LOC are as described with respect to the process 1400. MIXED_PALETTE denotes the mixed palette.

At 1502, the process 1500 assigns the loop variable LOC to zero. At 1504, the process 1400 tests whether the pixel at scan location LOC is encoded using a mixed palette entry by testing whether the palette index at PIXEL_MAP[LOC] is greater than the number of palette entries (i.e., MAX_FIXED) in the fixed palette. If so, the process 1500 proceeds to 1506; if not (indicating that the image pixel at the current scan location LOC was assigned a color in the first pass), the process 1500 proceeds to 1516.

At 1506, the process 1500 gets (e.g., reads, accesses, etc.) the mixed palette entry corresponding to the palette entry value at location LOC in the pixel map. At described above, the location (e.g., the index) of the mixed palette entry in the mixed palette can be indicative of at least one of the neighboring pixels, a mixing (e.g., combination) method, and manipulation deltas of the mixed value. As such, at 1508, the process 1500 determines the neighboring pixels, for example, as described above. It is noted that, in an implementation, the neighboring pixels are pixels whose values were determined using the first pass. At 1510, the process 1500 mixes (e.g., combines, such as by averaging) the values (e.g., the respective color components) of the neighboring pixels, resulting in a mixed value. Again, the mixed value can be multiple mixed values, each corresponding to a color component, as described with respect to row 1020 of FIG. 10. At 1512, the process 1500 calculates a manipulated value (i.e., MAN) according to the deltas of the mixed palette entry of 1506. Calculating the manipulated value (MAN) can be as described with respect to the row 1022 of FIG. 10.

At 1514, the process 1500 assigns the manipulated value (MAN) to the pixel at scan location LOC of the image block. At 1516, the loop variable LOC is incremented. At 1518, if all the scan locations have been processed, the process 1500 ends at 1520; otherwise the process 1500 proceeds back to 1504, which is described above.

As mentioned above, the second pass (e.g., such as described with respect to the process 1500) can be used when a pixel that is required for mixing for a current pixel at a scan location is at a subsequent scan location. However, that is not the case for all mixed palette entries. That is, for some mixed palette entries, all pixels required for the mixing may be at scan locations that are before the scan location of the current pixel. For example, when the group of pixels includes the top neighboring pixel, the left neighboring pixel, or a combination thereof, then all pixels required for mixing are available. As such, in some examples, the test at 1404 can be whether all neighboring pixels are available; and, correspondingly, the at 1504 the test can be whether the pixel map at the current location was processed in the first pass. In an example, the test at 1404 of whether all neighboring pixels are available can be based on the palette entry index. For example, and using the above example, the test at 1404 can be whether (PIXEL_MAP[LOC]<MAX_FIXED OR PIXELP_MAP[LOC]≥120). Any other similar, equivalent, or suitable technique can be used so that some of the mixing palette entries can be processed in the first pass by the process 1400.

Local mixing of colors using mixing palette entries is described in this disclosure. As local mixing palette entries can appear more often in an image than fixed (e.g., specialized) color values for the same purpose, the resulting entropy in an encoded image can be smaller than what is achievable with a large palette. For example, the entropy that results from using a fixed palette of size 100 with a mixing palette, can be smaller than using a palette that includes, for example, 256 colors. A small supplemental palette (e.g., the mixing palette) of colors that are added into the local mix of colors can be used. The mixing palette can be thought of as allowing color definitions such as "take 100% of a certain local color and make it 10% higher in luminosity" and "take 70% of a local color and mix into it 30% of Chartreuse Yellow."

As mentioned above, the palette indexes of previously coded (i.e., encoded or decoded) pixels (such as of a pixel map) can be used as context for selecting an entropy code for coding a current palette index of a current pixel. In an example, the entropy code can be a probability distribution that is used by an arithmetic encoder. In an example, the entropy code can be a variable-length code. In an example, the variable length code can be a Huffman code, or some other variable-length code. Other entropy codes are possible.

In an example, the entropy code can be derived (e.g., obtained, selected, chosen, determined, etc.) using a decision tree. The decision tree can include a root node, intermediate nodes, and leaf nodes. The decision tree can be a choice tree where at least some of the root or intermediate nodes have more than two children. In such a case, the child nodes of a node can be evaluated until one of the nodes results in a success (e.g., true or positive result). In an example, the decision tree can be a binary tree. In an example, each of the nodes can correspond to a decision. The decision can be with respect to (e.g., about, etc.) one or more characteristics of one or more of the context variables.

Figure 18:
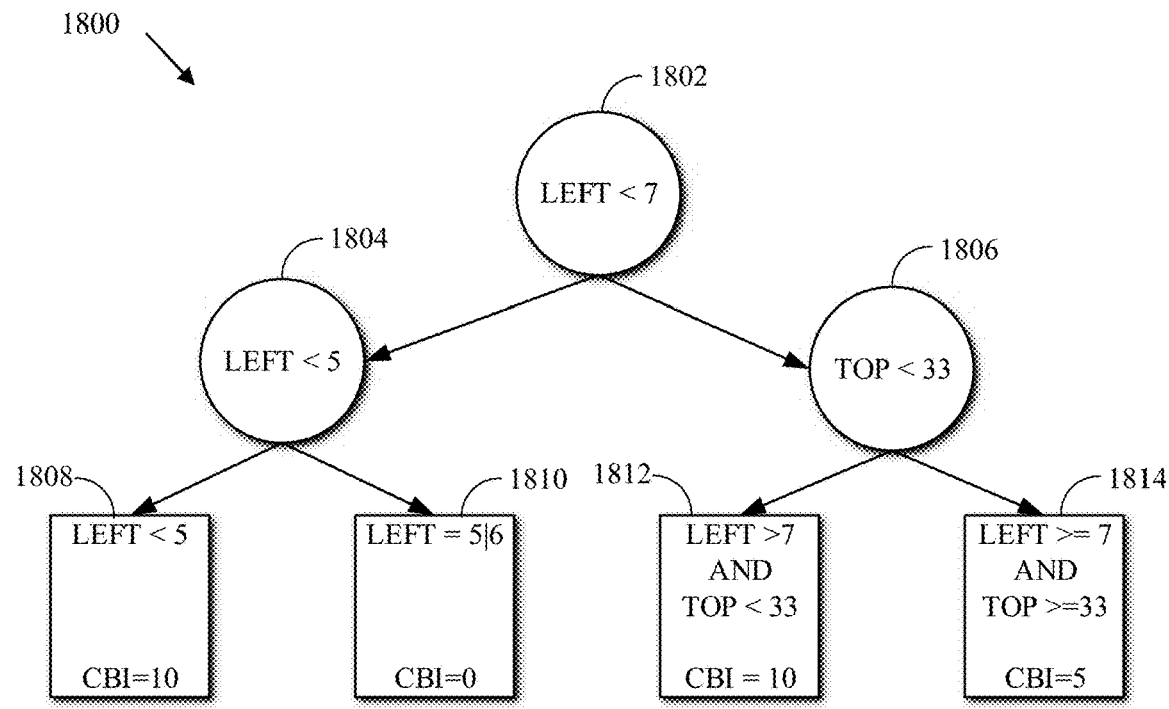
FIG. 18 is an example of a decision tree 1800 for coding a palette index according to implementations of this disclosure.

FIG. 18 is an example of a decision tree 1800 for coding a palette index according to implementations of this disclosure. In an example, the decision tree 1800 can be used by an entropy encoding unit of an encoder, such as the entropy encoding unit 440 of FIG. 4. In an example, the decision tree 1800 can be used by an entropy decoding unit of a decoder, such as the entropy decoding unit 510 of FIG. 5. The decision tree can be used to code indexes of palette indexes of a pixel map, such as the pixel map 1100 of FIG. 11. As mentioned above, some of the indexes of the pixel map can be indexes of fixed palette entries and other of the indexes can be indexes of mixed palette entries.

It is noted that the decision tree 1800 is a mere illustrative example and is not meant to limit this disclosure in any way. The specific values (e.g., 5, 7, and 33) used, the specific tests (e.g., the less than, "<"), the number of nodes (e.g., three nodes 1802-1806), the neighboring index entries (e.g., LEFT and TOP) used, or any other specific characteristics of the decision tree 1800 are merely for illustration purposes.

Index entries 1112 and 1114 of FIG. 11 are now used to illustrate the use of the decision tree 1800. A false (negative) result at a node causes processing to proceed to the left neighbor of the node, and a true (positive) result at a node causes processing to proceed to the right neighbor of the node. Processing proceeds left or right until a leaf node is reached.

In coding the index entry 1112 of FIG. 11, at the node 1802, as the palette index entry of the left value (i.e., 0) is less than 7, processing moves to the node 1804. At the node 1804, as the left neighboring value (i.e., 0) is also less than 5, then processing ends at a box 1808, which indicates the entropy code that is selected. The box 1808 shows a summary of all the conditions that are met (i.e., LEFT<7 & LEFT<5 which is equivalent to LEFT<5) and the entropy code to be used.

As mentioned above, the entropy code can be a probability model. As such, several probability models may be available and each may be associated with an index. As such, for example, a lookup table can be used to look up the probability model to be used as indicated at the box 1808.

In another example, and as also mentioned above, the entropy code can be a Huffman code (or, more generally, a variable-length code). Several Huffman codes can be available in a codebook. Each codebook entry (i.e., a Huffman code) can have a corresponding index (e.g., location) in the codebook. At the box 1808, the codebook index (CBI) of the Huffman code within the codebook is indicates (i.e., CBI=10). As such, the complete flow through the decision tree 1800 is as follows: if the LEFT neighboring index is less than 7 and the LEFT neighboring index is less than 5, then use the Huffman code at the $10^{th}$ location within the codebook to code the palette index of the index entry 1112. In an example, the codebook of entropy codes can be known to both the encoder and the decoder.

In coding the index entry 1114 of FIG. 11, at the node 1802, as the palette index entry of the left value (i.e., 57) is not less than 7, processing moves to the node 1806. At the node 1806, as the top neighboring value (i.e., 54) is not less than 33, then processing ends at a box 1814, which indicates the entropy code that is selected. The box 1814 shows a summary of all the conditions that are met (i.e., LEFT≥7 & TOP≥33) and the entropy code to be used is the CBI 5.

The box 1810 shows that if the left neighboring palette index in either 5 or 6, then the CBI at index 0 is used; and the box 1812 shows that if the left neighboring palette index is greater than 7 and the top neighboring palette index 33 is less than 33, then the Huffman code at CBI 10 is to be used.

Figure 19:
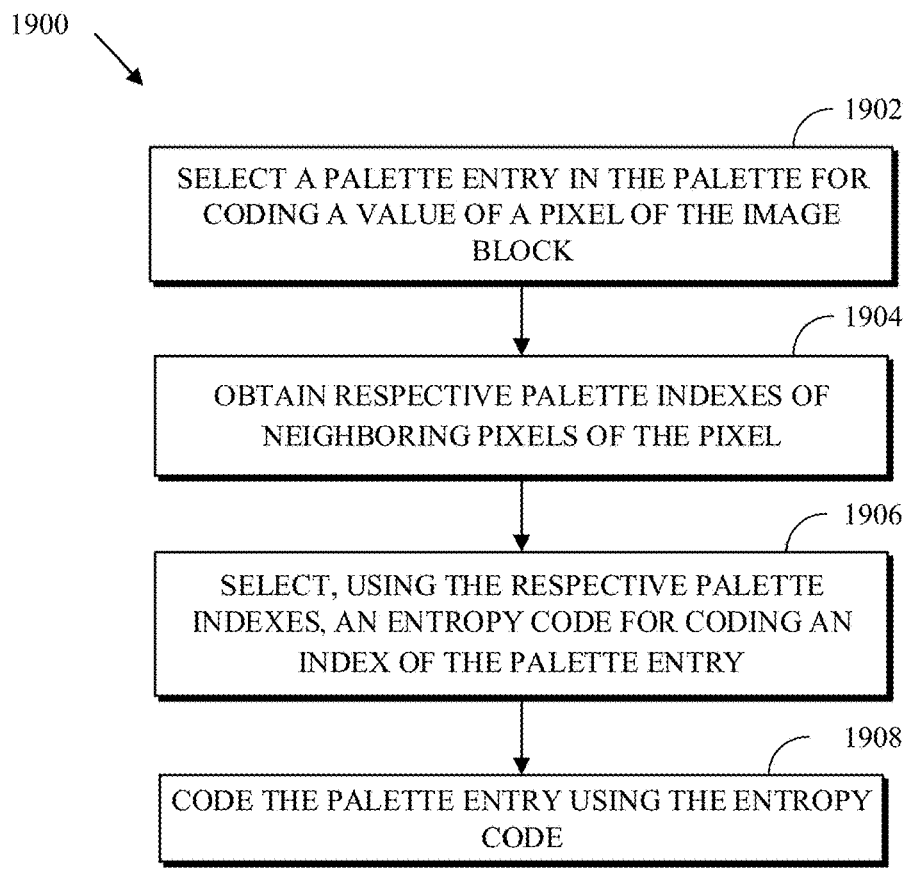
FIG. 19 is a flowchart of an example of a process of coding an image block using a palette according to implementations of this disclosure.

FIG. 19 is a flowchart of an example of a process 1900 of coding an image block using a palette according to implementations of this disclosure. The process 1900 can be used to select an entropy code for coding a palette entry index of a pixel map.

The process 1900 can be implemented, for example, as a software program that may be executed by computing devices such as the computing and communication devices 100A, 100B, 100C. The software program can include machine-readable instructions that may be stored in a memory such as the memory 110, and that, when executed by a processor, such as CPU 120, may cause the computing device to perform the process 1900.

The process 1900 can be implemented (e.g., executed, performed, etc.), in whole or in part, by a decoder, such as the decoder 500 of FIG. 5. The process 1900 can be implemented, at least in part, by an entropy decoding unit of a decoder, such as the entropy decoding unit 510 of FIG. 5. The process 1900 can be implemented, at least in part, by an entropy encoding unit of an encoder, such as the entropy encoding unit 440 of FIG. 4.

At 1902, the process 1900 selects a palette entry in the palette for coding a value of a pixel of the image block. The palette entry can be selected as described above. In an example, the palette can include fixed palette entries and mixed palette entries, as described above. Each mixed palette entry can indicate at least one of a pixel neighborhood indicating, for a to-be-decoded pixel, locations of pixels proximal to the to-be-decoded pixel whose color values are to be combined to obtain the to-be-decoded pixel, a mixing of the pixel neighborhood, or a manipulation of the mixing of the pixel neighborhood. In an example, the palette entry selected at 1902 can be a fixed palette entry. In an example, the palette entry selected at 1902 can be a mixed palette entry.

At 1904, the process 1900 obtains respective palette indexes of neighboring pixels of the pixel. In an example, the neighboring pixels of the pixel include a top neighbor and a left neighbor of the pixel of the image block. In an example, the neighboring pixels can include any neighboring pixels whose palette indexes are known at the time of coding the index of palette entry. For example, and referring to FIG. 10, when coding the palette entry index of the pixel 1002, any subset of the indexes of the pixels 1004-1010 can be used as context. In an example, immediate (e.g., adjacent) neighboring pixels, or remote (e.g., non-adjacent) neighboring pixels can be used. The process 1900 uses the respective palette indexes of neighboring pixels as context for selecting an entropy code for coding an index of the palette entry.

In some situations, at least one of the neighboring pixels may not be available. For example, the left neighbor of the index 1104 of FIG. 11 and a top neighbor of the index 1102 are not available in the block or pixel map itself. In an example, if the neighbor is available from/in the neighboring block, then the value from the neighboring block can be used. In an example, if the neighbor is now available, then the value of another available neighbor may be used. In an example, a neighbor is not available, then a default value may be used instead.

At 1906, the process selects, using the respective palette indexes, an entropy code for coding an index of the palette entry. In an example, the entropy code can be a probability distribution. In an example, the entropy code can be a variable-length code. In an example, the variable-length code can be a Huffman code. In an example, selecting, using the respective palette indexes, the entropy code can include using a decision tree to select the entropy code. At least some nodes of the decision tree can correspond, respectively, to logical decisions with respect to at least one of the respective palette indexes.

At 1908, the process 1900 codes the palette entry using the entropy code. In the case of an encoder, coding the palette entry using the entropy code means to encode the palette entry (e.g., the index of the palette entry) in a compressed bitstream, such as the compressed bitstream 404 of FIG. 4. In the case of a decoder, coding the palette entry using the entropy code means to decode the palette entry (e.g., the index of the palette entry) from a compressed bitstream, such as the compressed bitstream 404 of FIG. 5.

In an example, coding the palette entry using the entropy code can include decoding the decision tree from a encoded bitstream and decoding the palette entry using the decision tree. Any technique can be used to encode the decision tree in the compressed bitstream. To illustrate, and without loss of generality, the node 1802 of FIG. 18 (i.e., LEFT<7) may be encoded as 010111, where the first left-most bit (i.e., 0) indicates the left neighbor (where a 1 value would indicate the top neighbor); the next two bits (i.e., 10) indicate the logical test (where, for example, 00 indicates equal, 01 indicates greater than, 10 indicates less than, and 11 indicates not equal); and the next three bits (i.e., 111) correspond to the value 7.

For simplicity of explanation, the processes 700, 1300, 1400, 1500, and 1900 are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify," or any variations thereof, include selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of operations or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms, and/or instructions described herein. In addition, or alternatively, for example, a special-purpose computer/processor, which can contain specialized hardware for carrying out any of the methods, algorithms, or instructions described herein, can be utilized.

The transmitting computing and communication device 100A and the receiving computing and communication device 100B can, for example, be implemented on computers in a real-time video system. Alternatively, the transmitting computing and communication device 100A can be implemented on a server, and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device, and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available. The above-described implementations have been described in order to allow easy understanding of the application and are not limiting. On the contrary, the application covers various modifications and equivalent arrangements included within the scope of the appended claims, which scope is to be accorded the broadest interpretation as is permitted under the law so as to encompass all such modifications and equivalent arrangements.

What is claimed is:

1. An apparatus for coding an image block using a palette, comprising:
a processor configured to:
select a palette entry in the palette for coding a value of a pixel of the image block;
obtain respective palette indexes of neighboring pixels of the pixel, wherein the neighboring pixels comprise a top neighbor and a left neighbor of the pixel of the image block;
select, using the respective palette indexes, an entropy code for coding an index of the palette entry; and
code the index of the palette entry using the entropy code.

2. The apparatus of claim 1,
wherein the palette comprises fixed palette entries and mixed palette entries, and
wherein each mixed palette entry indicates at least one of:
a pixel neighborhood indicating, for a to-be-decoded pixel, locations of pixels proximal to the to-be-decoded pixel whose color values are to be combined to obtain the to-be-decoded pixel;
a mixing of the pixel neighborhood; or
a manipulation of the mixing of the pixel neighborhood.

3. The apparatus of claim 2, wherein the palette entry is one of the fixed palette entries.

4. The apparatus of claim 2, wherein the palette entry is one of the mixed palette entries.

5. The apparatus of claim 1, wherein the entropy code is a probability distribution.

6. The apparatus of claim 1, wherein the entropy code is a variable-length code.

7. The apparatus of claim 1, wherein to select, using the respective palette indexes, the entropy code for coding the index of the palette entry comprises:
using a decision tree to select the entropy code, wherein at least some nodes of the decision tree correspond respectively to logical decisions with respect to at least one of the respective palette indexes.

8. The apparatus of claim 7, wherein to code the palette entry using the entropy code comprises to:
decode the decision tree from an encoded bitstream; and
decode the palette entry using the decision tree.

9. A method for decoding an image block using a palette, comprising:
obtaining respective palette indexes of neighboring pixels of a pixel of the image block;
selecting an entropy code using the respective palette indexes;
decoding, from an encoded bitstream and based on the entropy code, an index of a palette entry; and
setting a value of the pixel using the palette entry.

10. The method of claim 9, wherein the neighboring pixels of the pixel of the image block comprise a top neighboring pixel of the pixel of the image block and a left neighboring pixel of the pixel of the image block.

11. The method of claim 9, wherein selecting the entropy code using the respective palette indexes comprises:
using a decision tree to select the entropy code, wherein each node of the decision tree corresponds to a logical decision with respect to at least one of the respective palette indexes.

12. The method of claim 11, further comprising:
decoding the decision tree from the encoded bitstream.

13. The method of claim 9, wherein the palette comprises fixed palette entries and mixed palette entries, and
wherein each mixed palette entry indicates at least one of:
a pixel neighborhood indicating, for a to-be-decoded pixel, locations of pixels proximal to the to-be-decoded pixel whose color values are to be combined to obtain the to-be-decoded pixel;
a mixing of the pixel neighborhood; or
a manipulation of the mixing of the pixel neighborhood.

14. The method of claim 13, wherein the palette entry is one of the fixed palette entries or one of the mixed palette entries.

15. An apparatus for decoding an image block, comprising: a processor configured to:
select a fixed palette including fixed palette entries;
select a mixed palette including mixed palette entries,
each mixed palette entry respectively indicates, with respect to a to-be-decoded pixel, a recipe for combining color values of pixels of a pixel neighborhood of the to-be-decoded pixel, wherein the pixel neighborhood indicates, for the to-be-decoded pixel, locations of pixels proximal to the to-be-decoded pixel whose color values are to be combined to decode the to-be-decoded pixel; and
decode first pixels of the image block using the mixed palette.

16. The apparatus of claim 15, wherein to decode the first pixels of the image block using the mixed palette comprises:
receive, in an encoded bitstream, a pixel map;
decode second pixels of the image block using the fixed palette; and
decode the second pixels of the image block using the mixed palette and the second pixels.

17. The apparatus of claim 16, wherein to decode the second pixels of the image block using the fixed palette comprises:
obtain respective palette indexes of neighboring pixels of a pixel of the second pixels; and
decode, from the encoded bitstream, a palette entry, wherein the respective palette indexes are used as a context for selecting an entropy code for coding the palette entry.

18. The apparatus of claim 17, wherein the neighboring pixels comprise a top neighbor and a left neighbor of the pixel of the second pixels.

19. The apparatus of claim 15, wherein to decode the first pixels of the image block using the mixed palette comprises:
obtain respective palette indexes of neighboring pixels of a pixel of the first pixels; and
decode, from an encoded bitstream, a palette entry, wherein the respective palette indexes are used as a context for selecting an entropy code for coding the palette entry.

20. The apparatus of claim 15, wherein the processor further configured to:
decode a decision tree from an encoded bitstream; and
use the decision tree to select an entropy code for decoding an index of a palette entry from the encoded bitstream.

* * * * *